United States Patent
Wada et al.

(10) Patent No.: US 11,889,205 B2
(45) Date of Patent: Jan. 30, 2024

(54) IMAGING APPARATUS

(71) Applicant: PANASONIC I-PRO SENSING SOLUTIONS CO., LTD., Fukuoka (JP)

(72) Inventors: Jyouji Wada, Fukuoka (JP); Yota Hashimoto, Fukuoka (JP); Hayato Wachi, Fukuoka (JP); Yuuichi Takenaga, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 4 days.

(21) Appl. No.: 17/586,121

(22) Filed: Jan. 27, 2022

(65) Prior Publication Data

US 2022/0247937 A1 Aug. 4, 2022

(30) Foreign Application Priority Data

Jan. 29, 2021 (JP) ................................ 2021-013556

(51) Int. Cl.
| | |
|---|---|
| *H04N 23/959* | (2023.01) |
| *G03B 17/12* | (2021.01) |
| *G03B 17/17* | (2021.01) |
| *H04N 23/45* | (2023.01) |
| *H04N 23/55* | (2023.01) |
| *H04N 23/80* | (2023.01) |
| *H04N 23/67* | (2023.01) |

(52) U.S. Cl.
CPC ........... *H04N 23/959* (2023.01); *G03B 17/12* (2013.01); *G03B 17/17* (2013.01); *H04N 23/45* (2023.01); *H04N 23/55* (2023.01); *H04N 23/671* (2023.01); *H04N 23/80* (2023.01)

(58) Field of Classification Search
CPC ...... H04N 23/959; H04N 23/45; H04N 23/55; H04N 23/671; H04N 23/80; H04N 23/60; G03B 17/12; G03B 17/17; G03B 3/00
See application file for complete search history.

(56) References Cited

U.S. PATENT DOCUMENTS

| | | | |
|---|---|---|---|
| 2010/0056928 A1* | 3/2010 | Zuzak | G01J 3/10 |
| | | | 356/302 |
| 2020/0021783 A1* | 1/2020 | Kawasumi | G02B 27/1026 |
| 2020/0380229 A1* | 12/2020 | Peruch | G06K 7/1443 |

FOREIGN PATENT DOCUMENTS

JP 2003-078802 3/2003

* cited by examiner

*Primary Examiner* — Nasim N Nirjhar
(74) *Attorney, Agent, or Firm* — Greenblum & Bernstein, P.L.C.

(57) ABSTRACT

An imaging apparatus includes a lens on which light from one subject is incident, a spectral prism including a first surface reflecting, at a first reflectance, first light having a first wavelength, and a second surface reflecting, at a second reflectance, having a second wavelength, a first imaging unit capturing a first image of the subject at a first depth of field based on the first light reflected by the first surface, a second imaging unit capturing a second image of the subject at a second depth of field based on the second light reflected by the second surface, a third imaging unit capturing a third image of the subject at a third depth of field based on third light transmitted through the first surface or the second surface, and a signal processing unit synthesizing the first image, the second image, and the third image, and outputting the synthesized image.

7 Claims, 15 Drawing Sheets

FIG. 6

| TYPE OF CROSS PRISM | TRANSMITTANCE ON A SURFACE OF PRISM | TRANSMITTANCE ON B SURFACE OF PRISM | FIRST CAMERA UNIT | SECOND CAMERA UNIT | THIRD CAMERA UNIT | RETURN LIGHT | IMPLEMENTED FUNCTION |
|---|---|---|---|---|---|---|---|
| TYPE A | 60% | 60% | VISIBLE LIGHT 24% | VISIBLE LIGHT 36% | VISIBLE LIGHT 24% | 10% | DDF |
| TYPE B | 80% | 60% | VISIBLE LIGHT 12% | VISIBLE LIGHT 48% | VISIBLE LIGHT 32% | 16% | DDF HDR |
| TYPE C | 90% | 50% | VISIBLE LIGHT 5% | VISIBLE LIGHT 45% | VISIBLE LIGHT 45% | 5% | HDR |
| TYPE D | 50% | INFRARED RAY 0% | VISIBLE LIGHT 50% | VISIBLE LIGHT 50% | INFRARED RAY | 0% | |

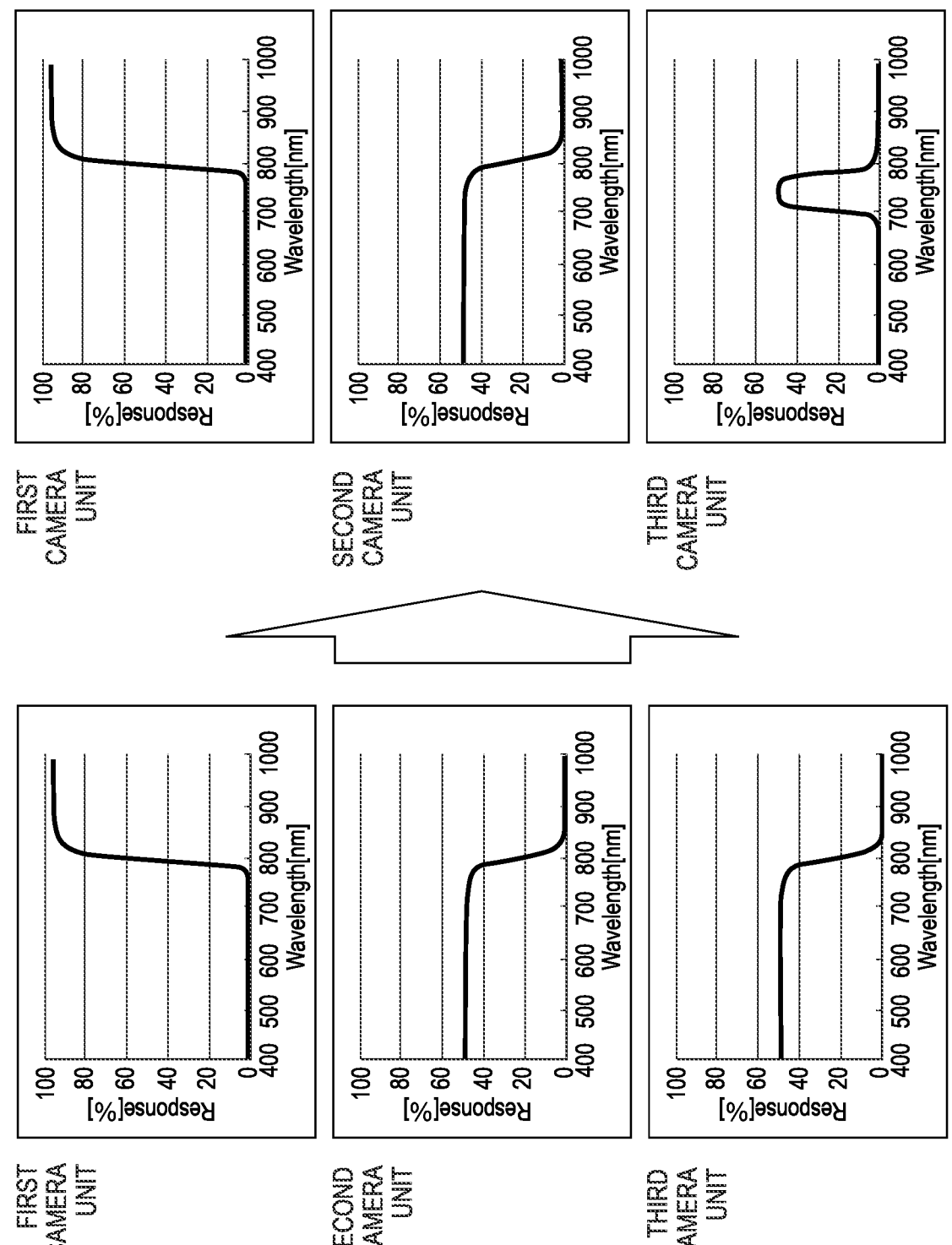

IMAGING APPARATUS

CROSS-REFERENCE TO RELATED APPLICATIONS

This application is based on and claims priority under 35 USC 119 from Japanese Patent Application No. 2021-013556 filed on Jan. 29, 2021, the contents of which are incorporated herein by reference.

TECHNICAL FIELD

The present disclosure relates to an imaging apparatus.

BACKGROUND ART

Patent Literature 1 discloses an imaging apparatus that images a subject in a wide range while focusing even when an image is captured with a random aperture value using an imaging lens having a random focal distance. This imaging apparatus includes: an imaging lens that captures images of a subject in a far field and a subject in a near field; an optical path dividing unit that divides an optical path of light passing through the imaging lens into a plurality of optical paths; different imaging elements that are respectively disposed in the divided optical paths and captures images of the subjects to generate video signals; an imaging element driving device that moves each imaging element along an optical axis direction thereof; and an arithmetic processing device that determines a position of each imaging element on the optical axis according to an input lens parameter. When the lens parameter is changed, the arithmetic processing device calculates a distance from a principal point of the imaging lens of each of a first imaging element and a second imaging element and drives the imaging element driving device, thereby moving arrangement of the imaging elements. As a result, an image having a widest depth of field is obtained.

CITATION LIST

Patent Literature

Patent Literature 1: JP-2003-78802-A

SUMMARY OF INVENTION

In the configuration of Patent Literature 1, when focusing is performed at an objective distance which is a distance from the principal point of the imaging lens to the subject, a focusing range farther than the objective distance is defined as a rear depth of field, and a focusing range closer to the imaging lens with respect to the objective distance is defined as a front depth of field. Therefore, for example, when there is no subject to be imaged in either the front depth of field or the rear depth of field, it is necessary to calculate the distances from the principal points of the imaging lenses of the first imaging element and the second imaging element each time to drive the imaging element driving device, and there is a chance that an operation delay occurs for a certain time. For example, when the imaging apparatus is disposed in a factory or the like, the distances to one or more subjects (for example, cargo or person) to be observed by the imaging apparatus are often roughly determined. In this way, in view of a fact that the distances to one or more subjects as viewed from the imaging apparatus are invariable, it can be said that there is room for improvement in obtaining a high-quality captured image corresponding to the subject while preventing the occurrence of the operation delay.

The present disclosure has been made in view of the above-described circumstances of related art, and an object of the present disclosure is to provide an imaging apparatus that prevents occurrence of an operation delay related to imaging of one or more subjects present within a distance range set in advance, and flexibly obtains a high-quality captured image corresponding to each subject.

The present disclosure provides an imaging apparatus including: a lens on which light from at least one subject is incident; a spectral prism having a first surface that reflects, at a first reflectance, first light having a first wavelength among the light from the subject and a second surface that reflects, at a second reflectance, second light having a second wavelength among light transmitted through the first surface; a first imaging unit that captures a first image of the subject at a first depth of field based on at least the first light reflected by the first surface; a second imaging unit that captures a second image of the subject at a second depth of field based on at least the second light reflected by the second surface; a third imaging unit that captures a third image of the subject at a third depth of field based on at least third light transmitted through the first surface or the second surface; a signal processing unit that synthesizes the first image, the second image, and the third image, and outputs the synthesized image.

According to the present disclosure, it is possible to prevent occurrence of an operation delay related to imaging of one or more subjects present within a distance range set in advance, and to flexibly obtain a high-quality captured image corresponding to each subject.

BRIEF DESCRIPTION OF DRAWINGS

FIG. 6 is a table illustrating characteristics of each type of spectral prisms shown in FIG. 2.

FIG. 9B is a graph showing a second example of transmission characteristics of each of the optical filters shown in FIG. 7.

DESCRIPTION OF EMBODIMENTS

Figure 1:
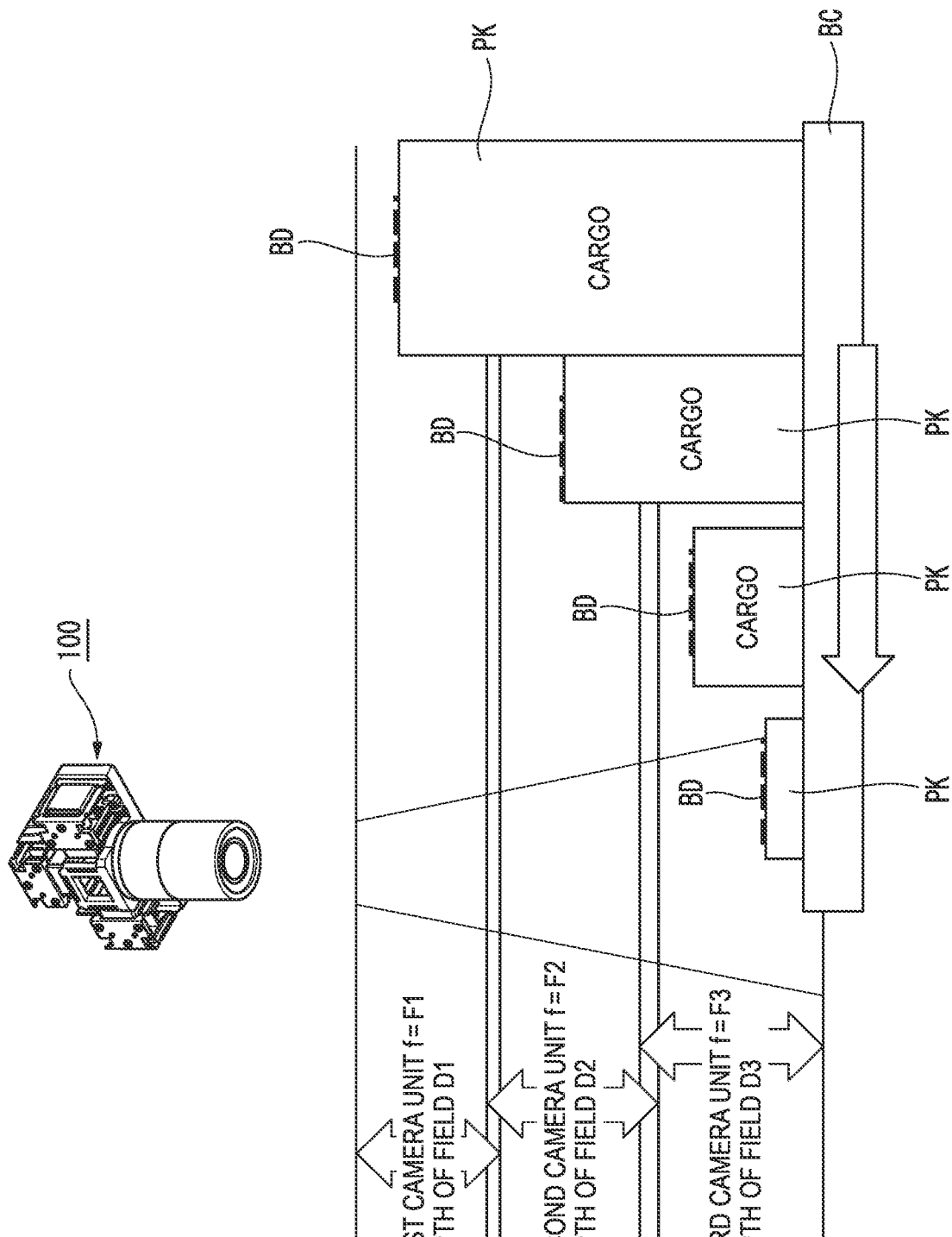
FIG. 1 is a diagram showing an example of a use case of a spectral prism camera according to a first embodiment.

Hereinafter, a plurality of embodiments specifically disclosing an imaging apparatus according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding for those skilled in the art. In addition, each of the accompanying drawings is referred to in accordance with a direction of the reference numerals. The accompanying drawings and the following description are provided for those skilled in the art to fully understand the present disclosure, and are not intended to limit the subject matter described in the claims.

As the imaging apparatus according to the present disclosure, for example, a tag label recognition apparatus for a cargo sorting system used in a distribution center (see first embodiment), or a head-mounted imaging apparatus (see second embodiment) that images an affected part of a patient so that the affected part is easily visually recognized by a doctor in an operating room of a hospital will be described as an example, but the present disclosure is not limited to these examples. The content of the present disclosure can be adopted for various applications as long as the content of the present disclosure can capture an image of a predetermined subject.

In addition, the "unit" or the "device" in each of the embodiments is not limited to a physical configuration that is simply mechanically implemented by hardware, and includes a configuration of which a function is implemented by software such as a program. In addition, a function of one configuration may be implemented by two or more physical configurations, or functions of two or more configurations may be implemented by, for example, one physical configuration.

First Embodiment

A first embodiment according to the present disclosure will be described with reference to FIGS. 1 to 12.

An example of a use case according to the first embodiment will be described with reference to FIG. 1. FIG. 1 is a diagram showing an example of a use case of a spectral prism camera 100 according to the first embodiment. The spectral prism camera 100 is an example of the imaging apparatus according to the present disclosure.

As shown in FIG. 1, a cargo sorting system used in, for example, a distribution center includes a transport device BC (for example, a conveyor device) of various types of cargoes PK having various heights, and a tag label recognition apparatus in which the spectral prism camera 100 according to the first embodiment is provided as a part thereof.

The transport device BC transports a plurality of types of cargoes PK having different heights (in other words, dimensions in a direction (vertical direction) perpendicular to a transport surface of the transport device BC) along a transport direction thereof. The cargoes PK each has, for example, a box shape such as cardboard, and a bar code BD of invisible ink is engraved on top surfaces of the cargoes PK as a tag label. The invisible ink has a characteristic of emitting (reflecting) near infrared ray (IR) light when receiving light, and cannot be visually recognized by human eyes.

As described later, the spectral prism camera 100 according to the first embodiment includes a cross prism CXP (an example of a spectral prism), a first camera unit 11 (an example of a first imaging unit), a second camera unit 12 (an example of a second imaging unit), and a third camera unit 13 (an example of a third imaging unit). An incident axis IMX of the spectral prism camera 100 is disposed along a height direction of the cargoes PK, and the spectral prism camera 100 images the top surfaces of the cargoes PK being transported. In the present use case, all of the first camera unit 11, the second camera unit 12, and the third camera unit 13 are provided to be capable of imaging near infrared ray (IR) light.

In the present use case, as described above, the cargoes PK having different heights are transported by the transport device BC, and the spectral prism camera 100 according to the first embodiment can implement a plurality of focal positions and a plurality of depths of field by each of the first camera unit 11, the second camera unit 12, and the third camera unit 13.

That is, due to this implementation, with the spectral prism camera 100 according to the first embodiment, the depth of field can also be relatively expanded by a single camera (for example, the first camera unit 11, the second camera unit 12, and the third camera unit 13), and thus it is possible to have a wide dynamic range in the height direction or a depth direction as viewed from the spectral prism camera 100. For example, in the first embodiment, ranges of a first depth of field D1, a second depth of field D2, and a third depth of field D3 respectively implemented by the first camera unit 11, the second camera unit 12, and the third camera unit 13 are spatially and continuously provided in the height direction or the depth direction (for example, the perpendicular direction (vertical direction) described above) as viewed from the spectral prism camera 100. Accordingly, a function of obtaining a wider depth of field in the height direction or the depth direction than the depth of field of a single camera unit (for example, the first camera unit 11) is implemented (hereinafter, this function may be abbreviated as "SDDF (Super Dynamic Depth of Field)"). Therefore, even when the wide range of the depth of field is implemented and the cargoes PK having different heights are transported, the spectral prism camera 100 according to the first embodiment can image the bar code BD of the invisible ink with high accuracy by appropriately focusing the bar code BD.

As another configuration, when the spectral prism camera 100 has a configuration in which a camera unit capable of imaging near infrared ray (IR) light and a camera unit capable of imaging visible light are included, it is possible to acquire an image in which both visible light and near infrared ray (IR) light are synthesized. That is, visible light reflected by the entire top surface of the cargo PK and near infrared ray (IR) light reflected by the bar code BD of the invisible ink are dispersed by the cross prism CXP (refer to the following description), and are individually imaged by the plurality of camera units (that is, the first camera unit 11, the second camera unit 12, and the third camera unit 13), respectively. Then, the images in which both the visible light and the near infrared ray (IR) light are individually and respectively imaged are synthesized into one image and displayed on a display device DP such as a display. Therefore, the spectral prism camera 100 according to the first embodiment can superimpose an image in which the bar code BD of the invisible ink is reflected on an image in which an outer shape of the top surface of the cargo PK is reflected, and display the superimposed image. Therefore, in this case, it is possible to improve visibility of the bar code BD of the cargo PK and improve sorting efficiency.

[Configuration of Spectral Prism Camera]

Figure 2:
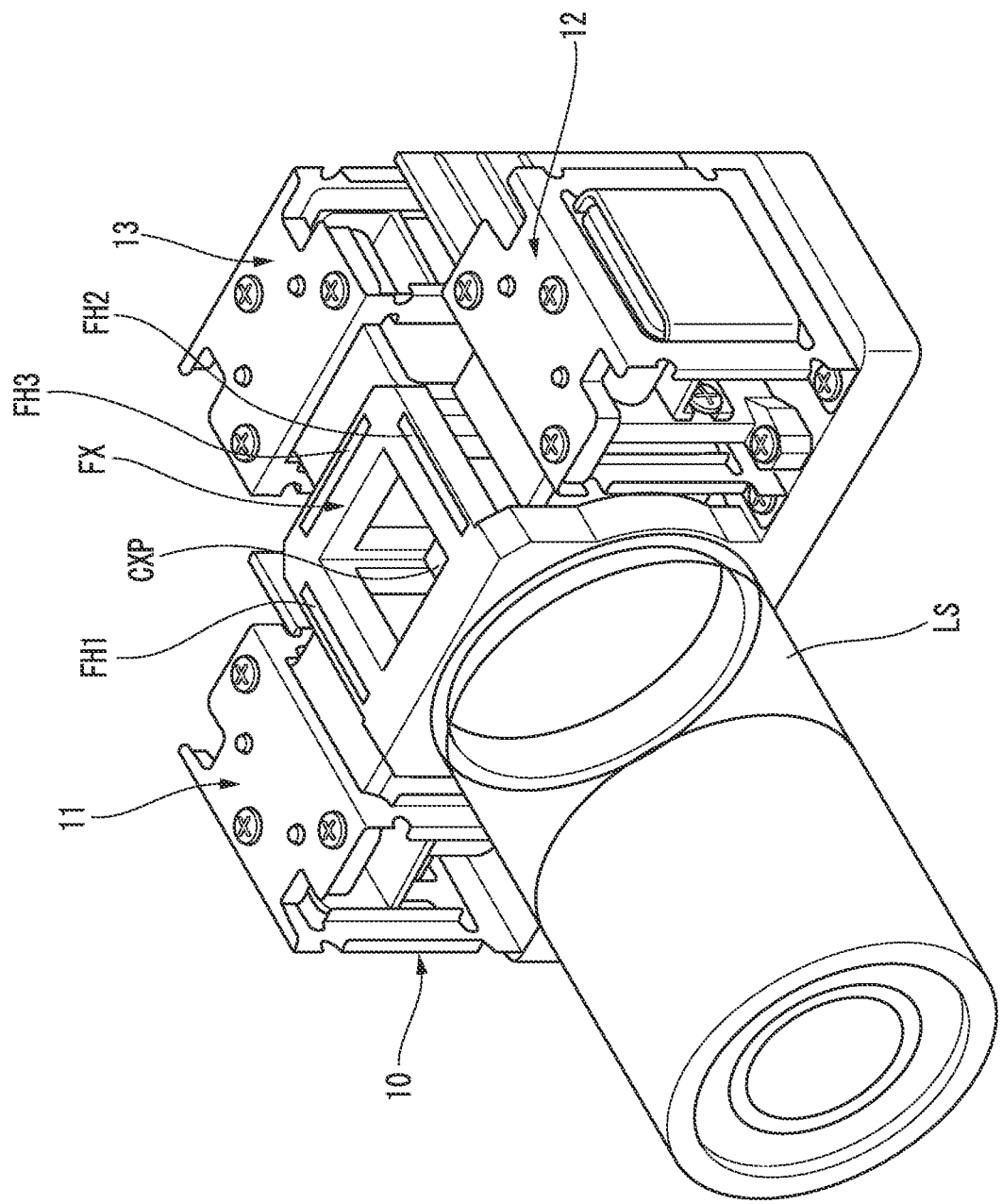
FIG. 2 is a perspective view illustrating an internal hardware configuration of the spectral prism camera according to the first embodiment.
Figure 3:
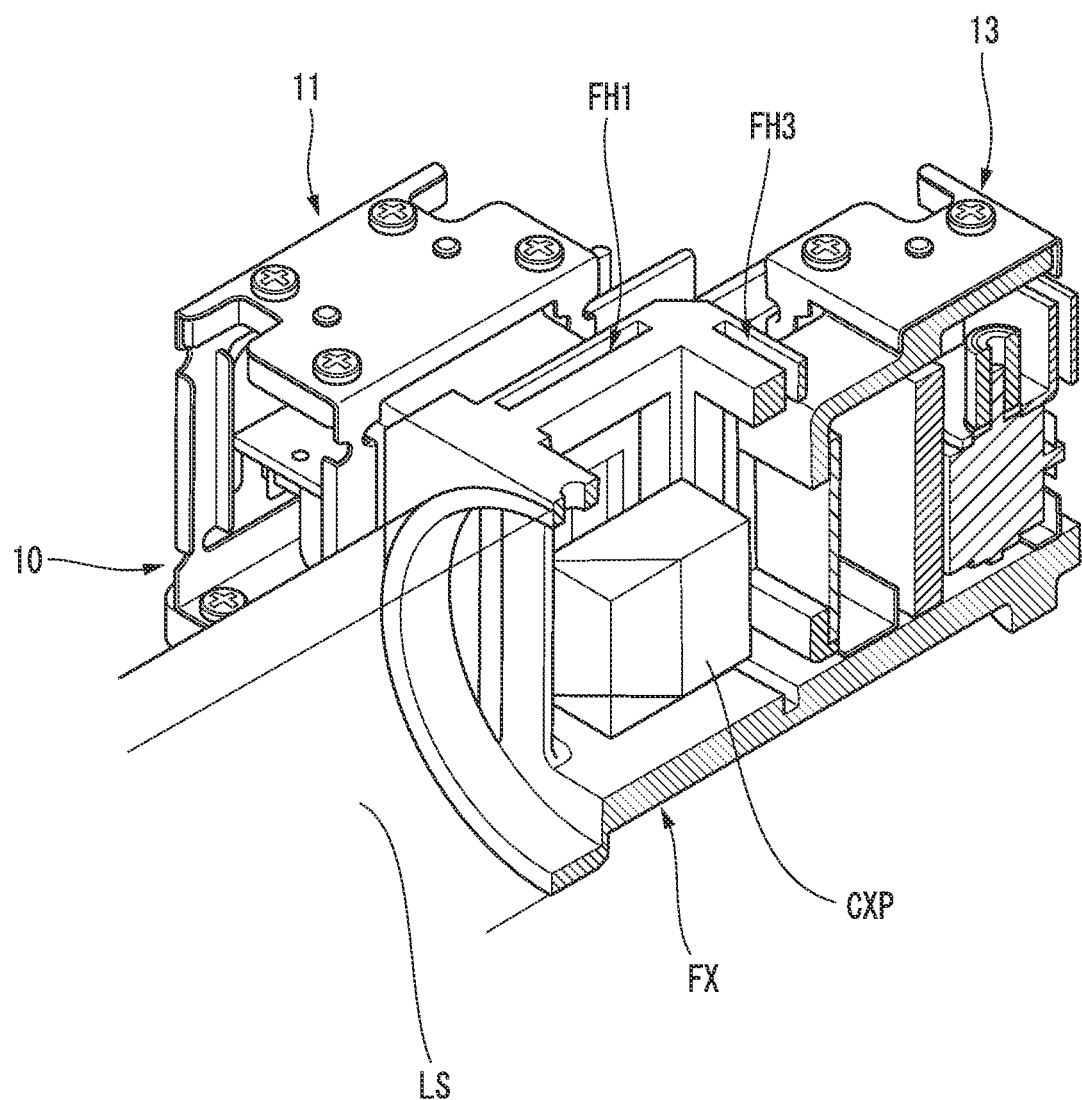
FIG. 3 is an exploded perspective view illustrating the internal hardware configuration of the spectral prism camera shown in FIG. 2.
Figure 4:
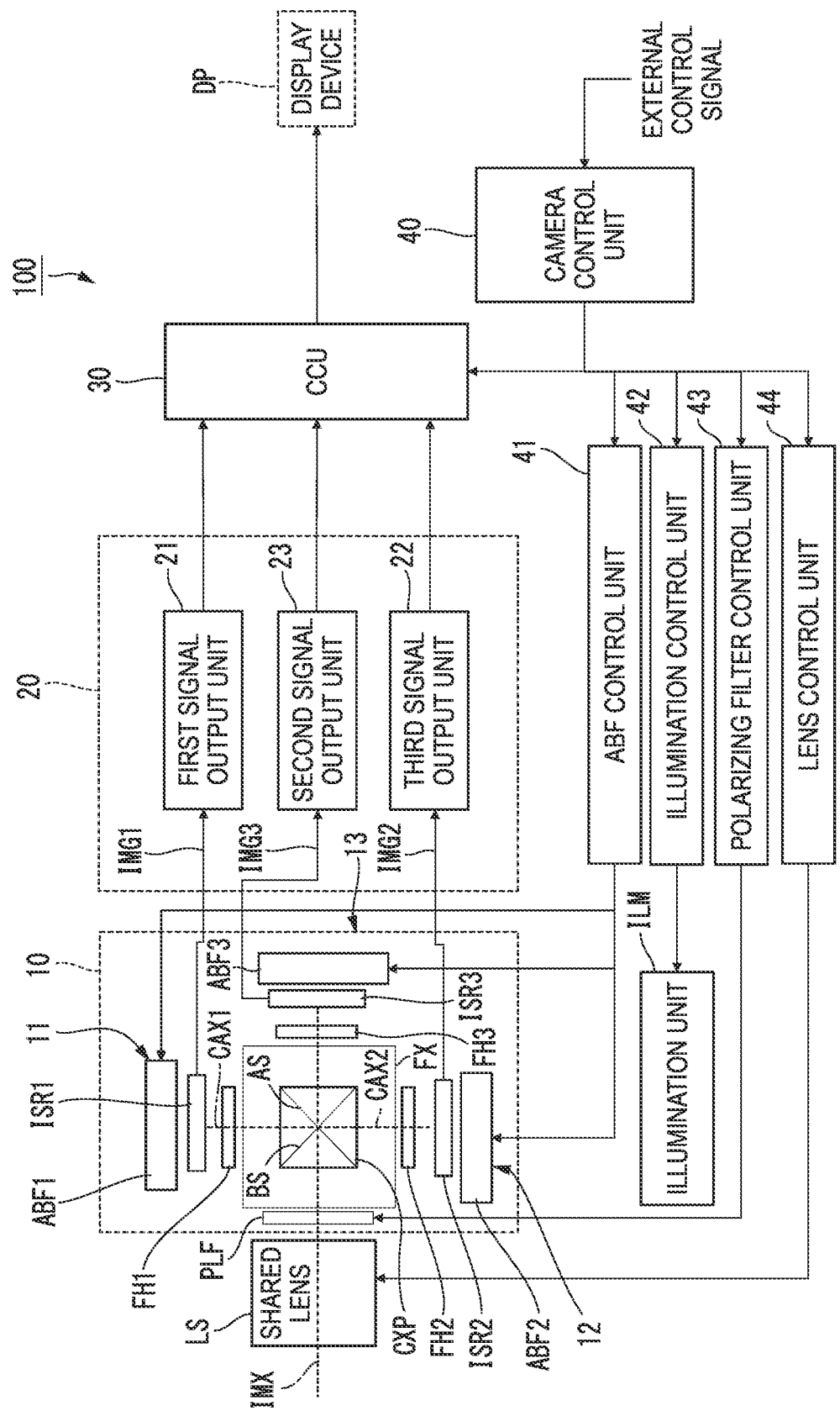
FIG. 4 is a block diagram showing an internal functional configuration of the spectral prism camera shown in FIG. 2.

The configuration of the spectral prism camera 100 will be described with reference to FIGS. 2 to 4. FIG. 2 is a perspective view illustrating an internal hardware configuration of the spectral prism camera 100 according to the first embodiment. FIG. 3 is an exploded perspective view illustrating the internal hardware configuration of the spectral prism camera 100 shown in FIG. 2. FIG. 4 is a block diagram showing an internal functional configuration of the spectral prism camera 100 shown in FIG. 2.

As shown in FIGS. 2 to 4, the spectral prism camera 100 includes a shared lens LS (an example of a lens), a camera head unit 10, a camera signal processing unit 20, a camera control unit (CCU) 30 (an example of a signal processing unit), a camera control unit 40 (an example of a control unit), an auto back focus (ABF) control unit 41, an illumination control unit 42, a polarizing filter control unit 43, a lens control unit 44, and an illumination unit ILM. The spectral prism camera 100 is connected to the display device DP via a wired or wireless connection, and the display device DP displays an image or a video captured by the spectral prism camera 100.

The shared lens LS as an example of a lens is formed as a lens unit including an optical lens attached to an object side (in other words, a side of the cargo PK (see FIG. 1), as an example of a subject, transported by the transport device BC) with respect to the cross prism CXP (described later) of the camera head unit 10. The light from the cargo PK as an example of the subject (for example, light reflected from the top surface of the cargo PK) is incident on the shared lens LS, and the shared lens LS condenses the incident light. The light from the cargo PK as an example of the subject that is condensed by the shared lens LS is incident on the cross prism CXP of the camera head unit 10.

The camera head unit 10 is disposed on the object side (that is, the side of the cargo PK transported by the transport device BC) next to the shared lens LS, and disperses or images the light transmitted through the shared lens LS. The camera head unit 10 includes a polarizing filter PLF, the cross prism CXP having two optical surfaces (for example, refer to an A surface AS and a B surface BS described later), the first camera unit 11 (an example of the first imaging unit), the second camera unit 12 (an example of the second imaging unit), and the third camera unit 13 (an example of the third imaging unit).

The polarizing filter PLF has an optical property of transmitting only a specific polarization component (for example, a p-polarization component and an s-polarization component with respect to a traveling direction of the light set by the polarizing filter control unit 43) of the light condensed by the shared lens LS (that is, the light from the subject).

The cross prism CXP (an example of the spectral prism) has an A surface AS (an example of a first surface) and a B surface BS (an example of a second surface) having optical surface properties, and is fixed by a prism fixing member FX. The cross prism CXP reflects and transmits the light condensed by the shared lens LS (that is, the light from the cargo PK as the subject) on the A surface AS or the B surface BS.

Figure 5:
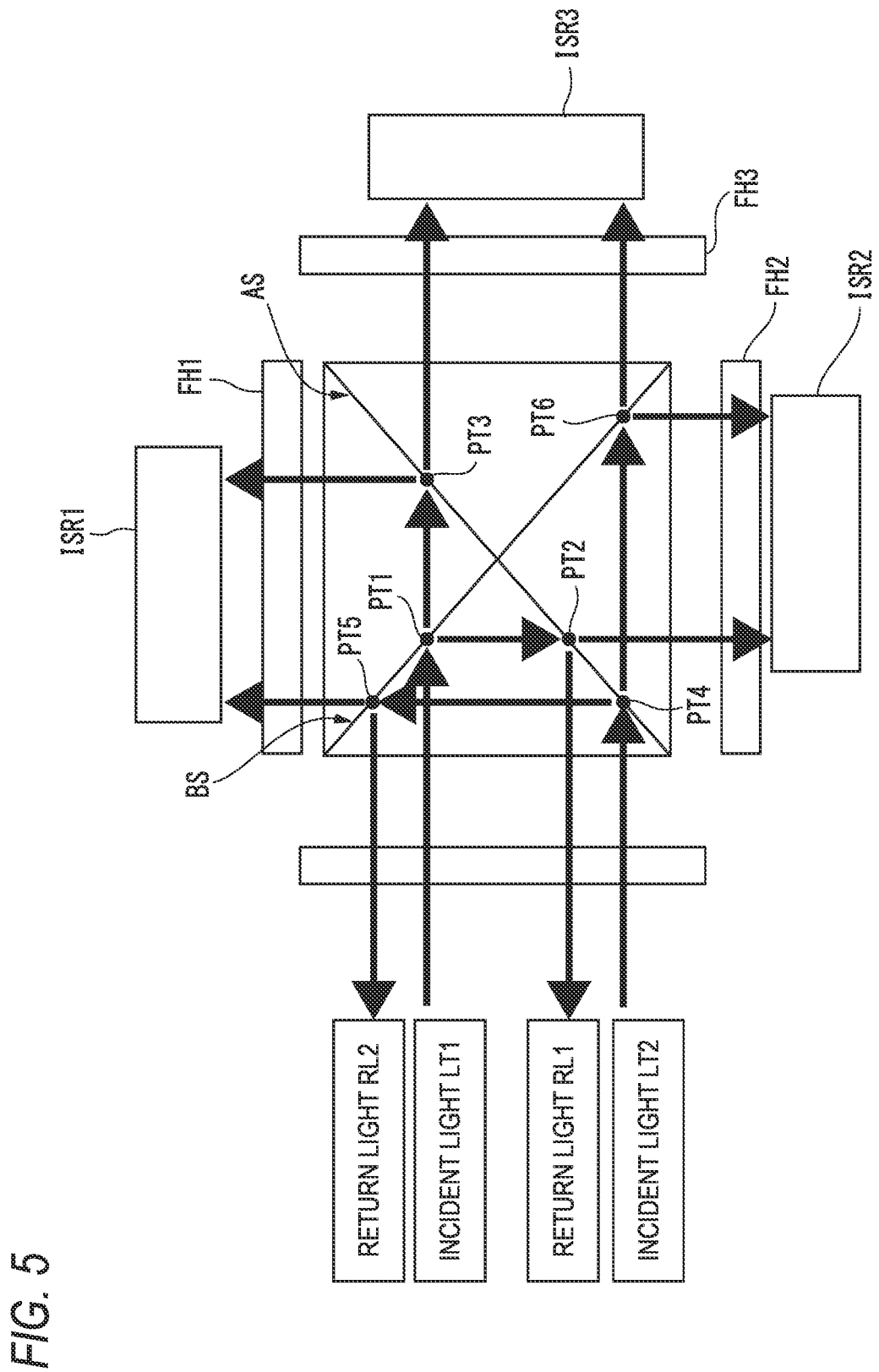
FIG. 5 is a schematic diagram showing an outline of operations related to dispersion of a cross prism shown in FIG. 2.

That is, the cross prism CXP has the A surface AS that reflects, at a first reflectance, first light (for example, visible light or near-infrared light) having a first wavelength (for example, a wavelength band of visible light or near-infrared light) among the light from the cargo PK (an example of the subject) transported by the transport device BC, and the B surface BS that reflects, at a second reflectance, second light (for example, visible light or near-infrared light) having a second wavelength (for example, a wavelength band of visible light or near-infrared light) among light transmitted through the A surface AS (see FIG. 5). In the first embodiment, the cross prism CXP is detachably provided in a main body of the spectral prism camera 100, and a plurality of types of cross prisms CXP having different optical properties are prepared, and the cross prism CXP is selected according to applications and attached to the main body (see FIG. 6).

The first camera unit 11 includes a first optical filter holding unit FH1, a first image sensor ISR1, and a first auto back focus mechanism ABF1 (an example of a drive unit). The first camera unit 11 captures a first image IMG1 of the top surface (an example of a subject) of the cargo PK having the first depth of field D1 based on the first light (for example, visible light or near-infrared light) reflected by the A surface AS of the cross prism CXP.

Each of the first optical filter holding unit FH1, a second optical filter holding unit FH2 (described later), and a third optical filter holding unit FH3 (described later) is formed to implement, for example, a band pass filter (BPF) that holds a plurality of optical filters OPF (an example of a filter, described later), transmits only light having a predetermined wavelength, and blocks light having wavelengths of other bands.

The first image sensor ISR1 includes, for example, a charge coupled device (CCD) or a complementary metal oxide semiconductor (CMOS) in which a plurality of pixels suitable for near infrared ray (IR) light having a wavelength of 830±30 [nm] are arranged.

The first image sensor ISR1 is disposed such that a first imaging axis CAX1 orthogonal to the incident axis IMX and an imaging surface are orthogonal to each other, so that light (near infrared ray (IR) light in the first embodiment) reflected or totally reflected by the A surface AS of the cross prism CXP is easily received. The first image sensor ISR1 images the top surface of the cargo PK transported by the transport device BC based on the received light (first light). The first image sensor ISR1 sends a signal of the first image IMG1 (for example, a near infrared image) related to the top surface of the cargo PK obtained by imaging to a first signal processing unit 21.

In the first embodiment, in order to read the bar code BD of the invisible ink engraved on the top surface of the cargo PK, the first image sensor ISR1 is formed to be capable of acquiring the near infrared image, but the present disclosure is not limited thereto. Depending on applications (use cases) other than the above, the first image sensor ISR1 may have a configuration including a CCD or a CMOS in which a plurality of pixels suitable for imaging visible light are arranged. The same applies to the second image sensor ISR2 and the third image sensor ISR3 to be described later.

The first auto back focus mechanism ABF1 is formed by, for example, a mechanism disclosed in Japanese Patent No. 3738777. The first auto back focus mechanism ABF1 appropriately adjusts a focal distance of the first image sensor ISR1 by moving the first image sensor ISR1 in a direction of the first imaging axis CAX1 while maintaining the state in which the imaging surface of the first image sensor ISR1 is orthogonal to the first imaging axis CAX1, based on a control signal from the ABF control unit 41 (refer to the description below).

That is, according to the first auto back focus mechanism ABF1, for example, even when a wavelength band of the light received by the first image sensor ISR1 is selected as a different wavelength band by the camera control unit 40 (described later), or even when there is a change in optical path length due to the different wavelength band, the first image sensor ISR1 can be moved in the direction of the first imaging axis CAX1 (an example of an optical axis direction), so that a clear near infrared image or visible image that is in focus can be obtained.

The first image sensor ISR1 may be disposed inside the first auto back focus mechanism ABF1, or may be provided separately from the first auto back focus mechanism ABF1. The same applies to the second image sensor ISR2 (described later) and the third image sensor ISR3 (described later).

Similarly to the first camera unit 11, the second camera unit 12 also includes the second optical filter holding unit FH2, the second image sensor ISR2, and a second auto back focus mechanism ABF2 (an example of the drive unit). The second camera unit 12 captures a second image IMG2 of the top surface of the cargo PK having the second depth of field D2 based on the second light reflected by the B surface BS of the cross prism CXP.

Similarly to the first image sensor ISR1, the second image sensor ISR2 may also have a configuration including a CCD or a CMOS in which a plurality of pixels suitable for near infrared ray (IR) light are arranged. As described above, the second image sensor ISR2 may also have a configuration including a CCD or a CMOS in which a plurality of pixels suitable for imaging visible light are arranged.

The second image sensor ISR2 is disposed such that a second imaging axis CAX2 orthogonal to the incident axis IMX and an imaging surface are orthogonal to each other, so that light (near infrared ray (IR) light or visible light in the first embodiment) reflected or totally reflected by the B surface BS of the cross prism CXP is easily received. Similarly, the second image sensor ISR2 also images the top surface of the cargo PK transported by the transport device BC based on the received light (second light). The second image sensor ISR2 sends a signal of the second image IMG2 (for example, a near infrared image or a visible image) related to the top surface of the cargo PK obtained by imaging to a second signal processing unit 22.

Similarly to the first auto back focus mechanism ABF1, the second auto back focus mechanism ABF2 is also formed by, for example, the mechanism disclosed in Japanese Patent No. 3738777. The second auto back focus mechanism ABF2 appropriately adjusts a focal distance of the second image sensor ISR2 by moving the second image sensor ISR2 in a direction of the second imaging axis CAX2 while maintaining the state in which the imaging surface of the second image sensor ISR2 is orthogonal to the second imaging axis CAX2, based on a control signal from the ABF control unit 41.

That is, according to the second auto back focus mechanism ABF2, for example, even when a wavelength band of the light received by the second image sensor ISR2 is selected as a different wavelength band by the camera control unit 40 (refer to the description below), or even when there is a change in optical path length due to the different wavelength band, the second image sensor ISR2 can be moved in the direction of the second imaging axis CAX2 (an example of the optical axis direction), so that a clear near infrared image or visible image that is in focus can be obtained. In the first embodiment, since the first camera unit 11 and the second camera unit 12 are line-symmetrically disposed with respect to the incident axis IMX, the first imaging axis CAX1 and the second imaging axis CAX2 coincide with each other.

Similarly to the first camera unit 11 and the second camera unit 12, the third camera unit 13 also includes the third optical filter holding unit FH3, the third image sensor ISR3, and a third auto back focus mechanism ABF3 (an example of the drive unit). The third camera unit 13 captures a third image IMG3 of the top surface (an example of the subject) of the cargo PK having the third depth of field D3 based on third light (for example, wavelength band of visible light or near-infrared light) transmitting through the A surface AS or the B surface BS of the cross prism CXP. In the first embodiment, the third camera unit 13 is disposed such that the imaging axis (optical axis) of the third camera unit 13 coincides with the incident axis IMX.

Similarly to the first image sensor ISR1 and the second image sensor ISR2, the third image sensor ISR3 may also have a configuration including a CCD or a CMOS in which a plurality of pixels suitable for near infrared ray (IR) light are arranged. As described above, the third image sensor ISR3 may also have a configuration including a CCD or a CMOS in which a plurality of pixels suitable for imaging visible light are arranged.

The third image sensor ISR3 is disposed such that the incident axis IMX and an imaging surface are orthogonal to each other, so that light (near infrared ray (IR) light or visible light in the first embodiment) transmitting through the A surface AS or the B surface BS of the cross prism CXP is easily received. Similarly, the third image sensor ISR3 also images the top surface of the cargo PK transported by the transport device BC based on the received light (third light). The third image sensor ISR3 sends a signal of the third image IMG3 (for example, a near infrared image or a visible image) related to the top surface of the cargo PK obtained by imaging to a third signal processing unit 23.

Similarly to the first auto back focus mechanism ABF1 and the second auto back focus mechanism ABF2, the third auto back focus mechanism ABF3 is also formed by, for example, the mechanism disclosed in Japanese Patent No. 3738777. The third auto back focus mechanism ABF3 appropriately adjusts a focal distance of the third image sensor ISR3 by moving the third image sensor ISR3 in the direction of the incident axis IMX while maintaining the state in which the imaging surface of the third image sensor ISR3 is orthogonal to the incident axis IMX, based on a control signal from the ABF control unit 41.

That is, according to the third auto back focus mechanism ABF3, for example, even when a wavelength band of the light received by the third image sensor ISR3 is selected as a different wavelength band by the camera control unit 40, or even when there is a change in optical path length due to the different wavelength band, the third image sensor ISR3 can be moved in the direction of the incident axis IMX (an example of the optical axis direction), so that a clear near infrared image that is in focus can be obtained. Further, even when since a plurality of subjects have different distances from the spectral prism camera 100, there are a plurality of lengths of focal distances to the respective subjects, the spectral prism camera 100 includes a plurality of camera units (for example, the first camera unit 11, the second camera unit 12, and the third camera unit 13) having different depths of field, and thus it is possible to obtain images that are in focus for the respective subjects.

The camera signal processing unit 20 generates captured image data in a format (for example, an RGB format or a YUV format) that can be recognized by a human using a signal of an image obtained by imaging in the camera head unit 10. The camera signal processing unit 20 includes the first signal processing unit 21, the second signal processing unit 22, and the third signal processing unit 23. In addition, the CCU 30 (refer to the description below) may be formed to be included in the camera signal processing unit 20.

Each of the first signal processing unit 21, the second signal processing unit 22, and the third signal processing unit 23 is formed by a processor such as a digital signal processor (DSP) or a field programmable gate array (FPGA). The first signal processing unit 21 performs various types of camera signal processing using the image signal from the first image sensor ISR1, generates the captured image data, and transmits the captured image data to the CCU 30. Similarly, the second signal processing unit 22 also performs various types of camera signal processing using the image signal from the second image sensor ISR2, generates the captured image data, and transmits the captured image data to the CCU 30. Similarly, the third signal processing unit 23 also performs various types of camera signal processing using the image signal from the third image sensor ISR3, generates the captured image data, and transmits the captured image data to the CCU 30.

The captured image data generated by each of the first signal processing unit 21, the second signal processing unit 22, and the third signal processing unit 23 is defined as visible image data, near infrared image data, or specific wavelength image data of the top surface of the cargo PK based on a type of the cross prism CXP and the corresponding internal configurations of the first camera unit 11, second camera unit 12, and third camera unit 13, and is appropriately selected or set depending on the applications of the spectral prism camera 100. The specific wavelength image data is image data obtained by only extracting components in a specific wavelength band set in advance by the camera signal processing performed in each of the first signal processing unit 21, the second signal processing unit 22, and the third signal processing unit 23.

The CCU 30 as an example of the signal processing unit is formed by a processor such as a DSP or an FPGA, and executes various types of image analysis processing (for example, inter-image calculation or image synthesis) using the captured image data from each of the first signal processing unit 21, the second signal processing unit 22, and the third signal processing unit 23. For example, the CCU 30 is formed to be capable of performing high-dynamic-range rendering (HDR) as one type of the image analysis processing. In addition, the CCU 30 performs the image synthesis in which the image data (first image IMG1) from the first signal processing unit 21, the image data (second image IMG2) from the second signal processing unit 22, and the image data (third image IMG3) from the third signal processing unit 23 are superimposed, and displays and outputs the superimposed image data on the display device DP (in other words, performs the image synthesis and outputs the superimposed image data).

The CCU 30 may analyze a state, a property, and the like of a subject such as the top surface of the cargo PK or an object (for example, an object to be analyzed) placed on the subject by the above-described image analysis processing (for example, refer to a second modification of the first embodiment to be described later, and FIG. 12).

The camera control unit 40 as an example of the control unit is formed by a processor such as a central processing unit (CPU), a DSP, or an FPGA, and collectively performs various types of control related to operations of the spectral prism camera 100. For example, the camera control unit 40 transmits a control signal related to auto back focus to the ABF control unit 41, and transmits a control signal related to illumination to the illumination control unit 42. In addition, the camera control unit 40 transmits a control signal related to polarization characteristics of the polarizing filter PLF to the polarizing filter control unit 43, and transmits a control signal related to characteristic adjustment of the shared lens LS to the lens control unit 44. In addition, the camera control unit 40 generates and transmits a control signal of the depth of field based on information on a distance to the subject as the above-described control signal related to the auto back focus. The camera control unit 40 may be formed to be capable of executing various types of control related to the operations of the spectral prism camera 100 by receiving an external control signal based on an external input different from that of the spectral prism camera 100.

Based on the control signal from the camera control unit 40, the ABF control unit 41 independently generates and transmits control signals related to forward movement, backward movement, origin detection, and position keeping to each of the first auto back focus mechanism ABF1, the second auto back focus mechanism ABF2, and the third auto back focus mechanism ABF3. Accordingly, each of the first auto back focus mechanism ABF1, the second auto back focus mechanism ABF2, and the third auto back focus mechanism ABF3 can execute the forward movement, the backward movement, the origin detection, and the position keeping based on the control signals from the ABF control unit 41.

The illumination control unit 42 generates a control signal related to on/off and a light amount of light emitted from the illumination unit ILM based on the control signal from the camera control unit 40, and transmits the control signal to the illumination unit ILM.

The polarizing filter control unit 43 turns the polarizing filter PLF based on the control signal from the camera control unit 40 to set a polarization angle of the light from the subject to be transmitted through the polarizing filter PLF (for example, angles of the p-polarization component and the s-polarization component with respect to the traveling direction of the light from the subject).

The lens control unit 44 generates control signals related to an aperture, a magnification, and a focus of the shared lens LS based on the control signal from the camera control unit 40. Accordingly, in the spectral prism camera 100, it is possible to appropriately adjust the aperture, the magnification, and the focus of the shared lens LS.

The illumination unit ILM irradiates a subject such as the top surface of the cargo PK with visible light, near infrared ray (IR) light, or excitation light in a specific wavelength band based on the control signal from the illumination control unit 42. The light emitted from the illumination unit ILM is, for example, visible light, near infrared ray (IR) light, or excitation light in a specific wavelength band. In the first embodiment, it is possible to more clearly image the bar code BD of the invisible ink engraved on the top surface of the cargo PK by the irradiation of the excitation light.

The display device DP is formed by using a display such as a liquid crystal display (LCD) or an organic electroluminescence (EL) device, and displays the image data after the CCU 30 executes the image synthesis.

With reference to FIGS. 5 and 6, an outline of operations related to dispersion of the cross prism CXP and characteristics of each type of spectral prisms will be described. FIG. 5 is a schematic diagram showing the outline of the operations related to the dispersion of the cross prism CXP shown in FIG. 2. FIG. 6 is a table illustrating the characteristics of each type of the spectral prisms shown in FIG. 2.

As shown in FIG. 5, the light (for example, each of light LT1 and light LT2 illustrated in FIG. 5) from the subject such as the top surface of the cargo PK passes through the shared lens LS (not shown in FIG. 5) and is incident on the cross prism CXP (see FIGS. 2 to 4).

With respect to the light LT1, a part (that is, a part of the light LT1) is reflected at a first point PT1 on the B surface BS of the cross prism CXP, and a remaining part of the light LT1 transmits through the B surface BS. A ratio of reflection and transmission of the light LT1 is expressed as optical characteristics (specifically, reflectance) of the B surface BS. The same applies to the following description (see FIG. 6). A part of the light LT1 reflected by the B surface BS changes a direction thereof at a right angle due to the reflection by the B surface BS and travels in parallel to the second imaging axis CAX2 (see FIG. 4). At a second point PT2 on the A surface AS of the cross prism CEP, a part of the part of the light LT1 reflected by the B surface BS passes through the A surface AS and the optical filter OPF of the second optical filter holding unit FH2 and is received by the second image sensor ISR2. At the same time, a remaining part of the part of the light LT1 (that is, a part of the light LT1 that is reflected at the first point PT1 and does not pass through the A surface AS) is reflected at the second point PT2 of the A surface AS, travels in a direction opposite to the incident direction of the light, and returns ("return light RL1" illustrated in FIG. 5).

On the other hand, a remaining part of the light LT1 that passes through the first point PT1 travels in parallel to the incident axis IMX, and at a third point PT3 on the A surface AS of the cross prism CXP, a part of the remaining part of the light LT1 passes through the A surface AS and the optical filter OPF of the third optical filter holding unit FH3 and is received by the third image sensor ISR3. At the same time, a remaining part of the remaining part of the light LT1 (that is, a part of the light LT1 that passes through the first point PT1 and does not pass through the A surface AS) is reflected at the third point PT3 of the A surface AS, travels along the first imaging axis CAX1, passes through the optical filter OPF of the first optical filter holding unit FH1, and is received by the first image sensor ISR1.

Next, with respect to the light LT2, a part (that is, a part of the light LT2) is reflected at a fourth point PT4 on the A surface AS of the cross prism CXP, and a remaining part of the light LT2 transmits through the A surface AS. A part of the light LT2 reflected by the A surface AS travels in parallel to the first imaging axis CAX1 due to the reflection by the A surface AS. At a fifth point PT5 on the B surface BS of the cross prism CEP, a part of the part of the light LT2 reflected by the A surface AS passes through the B surface BS and the optical filter OPF of the first optical filter holding unit FH1 and is received by the first image sensor ISR1. At the same time, a remaining part of the part of the light LT2 (that is, a part of the light LT2 that is reflected at the fourth point PT4 and does not pass through the B surface BS) is reflected at the fifth point PT5 of the B surface BS, travels in the direction opposite to the incident direction of the light, and returns ("return light RL2" illustrated in FIG. 5).

Similarly, on the other hand, a remaining part of the light LT2 that passes through the fourth point PT4 travels in parallel to the incident axis IMX, and at a sixth point PT6 on the B surface BS of the cross prism CXP, a part of the remaining part of the light LT2 passes through the B surface BS and the optical filter OPF of the third optical filter holding unit FH3 and is received by the third image sensor ISR3. At the same time, a remaining part of the remaining part of the light LT2 (that is, a part of the light LT2 that passes through the fourth point PT4 and does not pass through the B surface BS) is reflected at the sixth point PT6 of the B surface BS, travels along the second imaging axis CAX2, passes through the optical filter OPF of the second optical filter holding unit FH2, and is received by the second image sensor ISR2.

Here, as shown in FIG. 6, by appropriately selecting or changing a type (for example, types A to D in FIG. 6) of the cross prism CXP attached to the spectral prism camera 100, it is possible to change a function (for example, the SDDF and/or the HDR described above) implemented by the spectral prism camera 100. The outline of the operations related to the cross prism CXP is as described above in any of the types (see FIG. 5).

When a type A in which a transmittance on the A surface AS is 60% and a transmittance on the B surface BS is 60% is selected as the type of the cross prism CXP, among the incident light, 24% of visible light is dispersed in the first camera unit 11 (first image sensor ISR1), 36% of visible light is dispersed in the second camera unit 12 (second image sensor ISR2), and 24% of visible light is dispersed in the third camera unit 13 (third image sensor ISR3), so as to be capable of being received. As a result, by selecting the type A, the function of the SDDF described above can be implemented by the spectral prism camera 100. When the type A is selected, the return light becomes 10%.

In addition, when a type B in which the transmittance on the A surface AS is 80% and the transmittance on the B surface BS is 60% is selected as the type of the cross prism CXP, among the incident light, 12% of visible light is dispersed in the first camera unit 11, 48% of visible light is dispersed in the second camera unit 12, and 32% of visible light is dispersed in the third camera unit 13, so as to be capable of being received. As a result, by selecting the type B, the functions of both the SDDF and the HDR described above can be implemented by the spectral prism camera 100. When the type B is selected, the return light becomes 16%.

In addition, when a type C in which the transmittance on the A surface AS is 90% and the transmittance on the B surface BS is 50% is selected as the type of the cross prism CXP, among the incident light, 5% of visible light is dispersed in the first camera unit 11, 45% of visible light is dispersed in the second camera unit 12, and 45% of visible light is dispersed in the third camera unit 13, so as to be capable of being received. As a result, by selecting the type C, the function of the HDR can be implemented by the spectral prism camera 100. When the type C is selected, the return light becomes 5%.

When a type D in which the transmittance on the A surface AS is 50% and a transmittance of near infrared ray (IR) on the B surface BS is 0% (that is, the reflectance is 100%) is selected as the type of the cross prism CXP, among the incident light, 50% of visible light is dispersed in the first camera unit 11, 50% of visible light is dispersed in the second camera unit 12, and visible light of near infrared ray (IR) light is dispersed in the third camera unit 13, so as to be capable of being received. When the type D is selected, the return light becomes 0%.

Figure 7:
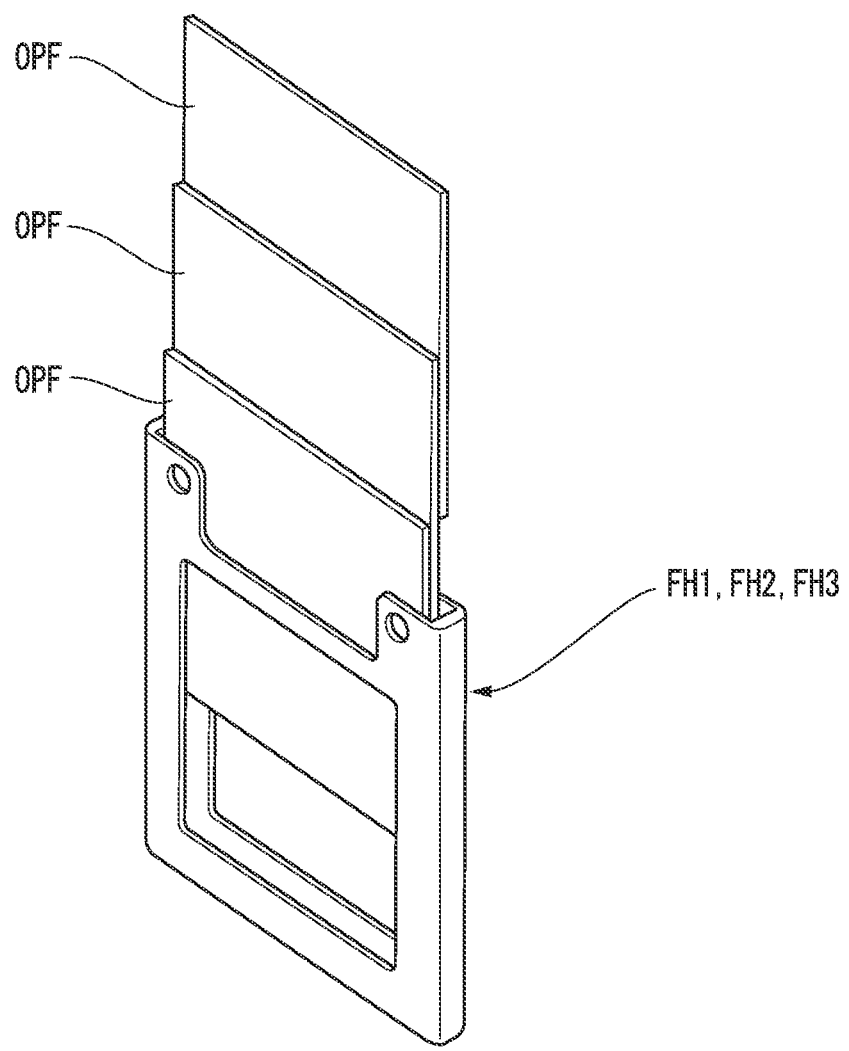
FIG. 7 is a perspective view illustrating an internal hardware configuration of optical filters shown in FIG. 2.
Figure 8:
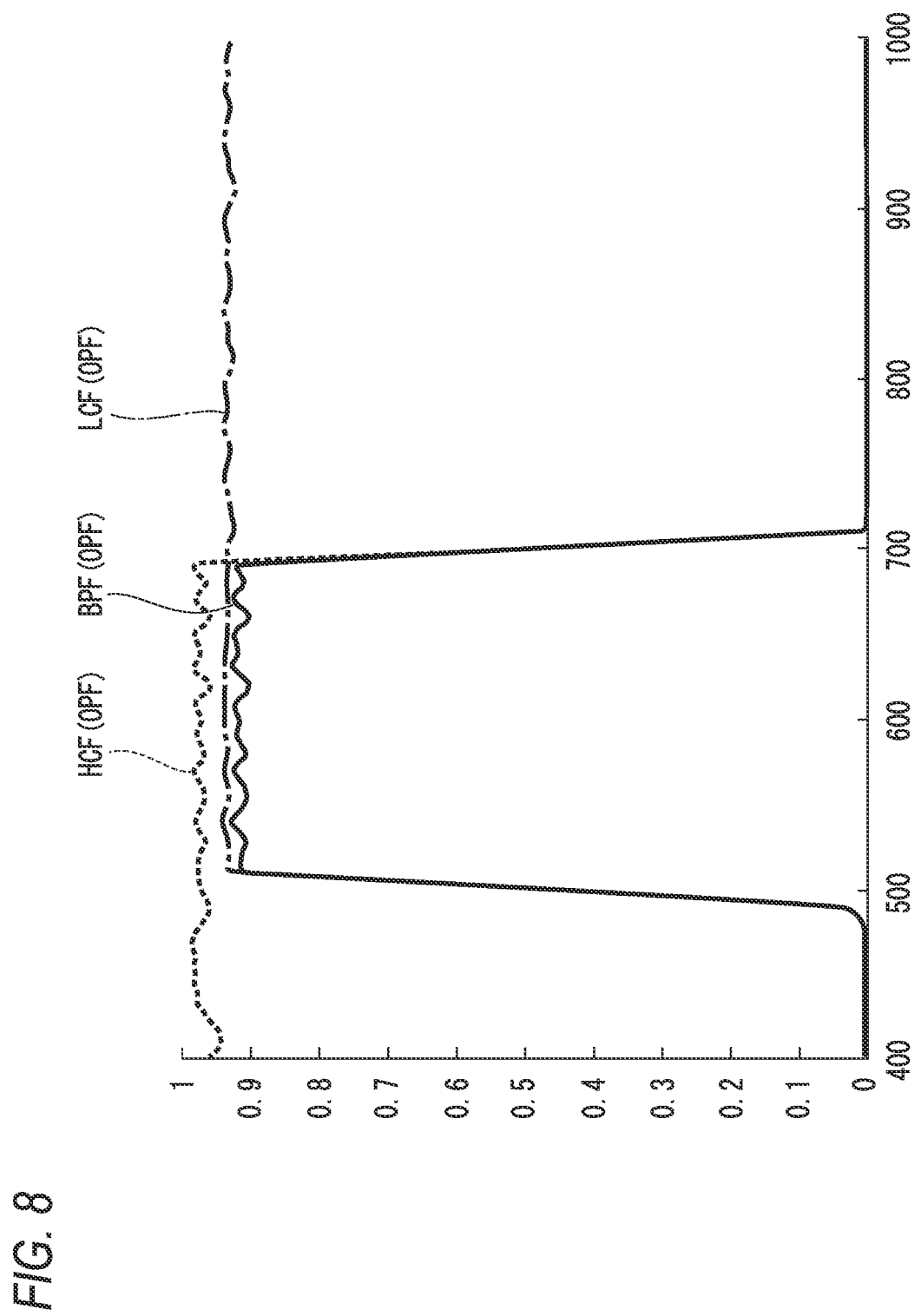
FIG. 8 is a graph illustrating transmission characteristics of all the optical filters shown in FIG. 7.

Next, respective configurations of the first optical filter holding unit FH1, the second optical filter holding unit FH2, and the third optical filter holding unit FH3 and optical characteristics (transmission characteristics) of the optical filters OPF thereof will be described with reference to FIGS. 7 to 9B. FIG. 7 is a perspective view illustrating an internal hardware configuration of the optical filters OPF shown in FIG. 2. FIG. 8 is a graph illustrating the transmission characteristics of all the optical filters OPF shown in FIG. 7. The content shown in FIG. 8 is an example for convenience of the description, and the present disclosure is not limited thereto.

As shown in FIG. 7, each of the first optical filter holding unit FH1, the second optical filter holding unit FH2, and the third optical filter holding unit FH3 is formed to have a frame-shaped frame body, and is provided to be easily detachable from the main body of the spectral prism camera 100 in a cassette type by a manual operation of a user.

The first optical filter holding unit FH1 is disposed along the first imaging axis CAX1 (an example of the optical axis) of the first camera unit 11. The second optical filter holding unit FH2 is disposed along the second imaging axis CAX2 (an example of the optical axis) of the second camera unit 12. The third optical filter holding unit FH3 is disposed along the incident axis IMX (an example of the optical axis of the third camera unit 13). Further, each of the first optical filter holding unit FH1, the second optical filter holding unit FH2, and the third optical filter holding unit FH3 is provided such that three optical filters OPF can be attached to the inside of the frame-shaped frame body in a state in which the three optical filters OPF overlap each other, and integrally holds the three optical filters OPF.

Each of the optical filters OPF is formed in a plate shape. The optical filter OPF on a back side in FIG. 7 is a low cut filter (LCF). The optical filter OPF in the middle in FIG. 7 is a high cut filter (HCF). The optical filter OPF on a front side in FIG. 7 is a neutral density filter (NDF) that only reduces an amount of light without affecting colors.

As shown in FIG. 8, among the plurality of optical filters OPF, the low cut filter blocks light having a wavelength of, for example, less than approximately 500 [nm], and only transmits light having a wavelength equal to or greater than 500 [nm]. Conversely, the high cut filter blocks light having a wavelength of, for example, approximately 700 [nm] or more, and only transmits light having a wavelength less than 700 [nm]. Therefore, when light transmits in a state in which the low cut filter and the high cut filter overlap each other, for example, a function of a band pass filter (BPF) that only transmits light having a wavelength of approximately 500 to 700 [nm] and blocks light having a wavelength of bands other than 500 to 700 [nm] is implemented. In FIG. 8, as an example, the wavelength band of light to be transmitted as the band pass filter is set to approximately 500 to 700 [nm], but the wavelength band is not limited thereto. The wavelength band of the light is appropriately selected and set according to the applications of the spectral prism camera 100.

With this configuration, the plurality of optical filters OPF of the first camera unit 11 adjust a transmission band of the light (an example of the first light) received by the first camera unit 11. The plurality of optical filters OPF of the second camera unit 12 adjust a transmission band of the light (an example of the second light) received by the second camera unit 12. The plurality of optical filters OPF of the third camera unit 13 adjust a transmission band of the light (an example of the third light) received by the third camera unit 13.

Figure 9A:
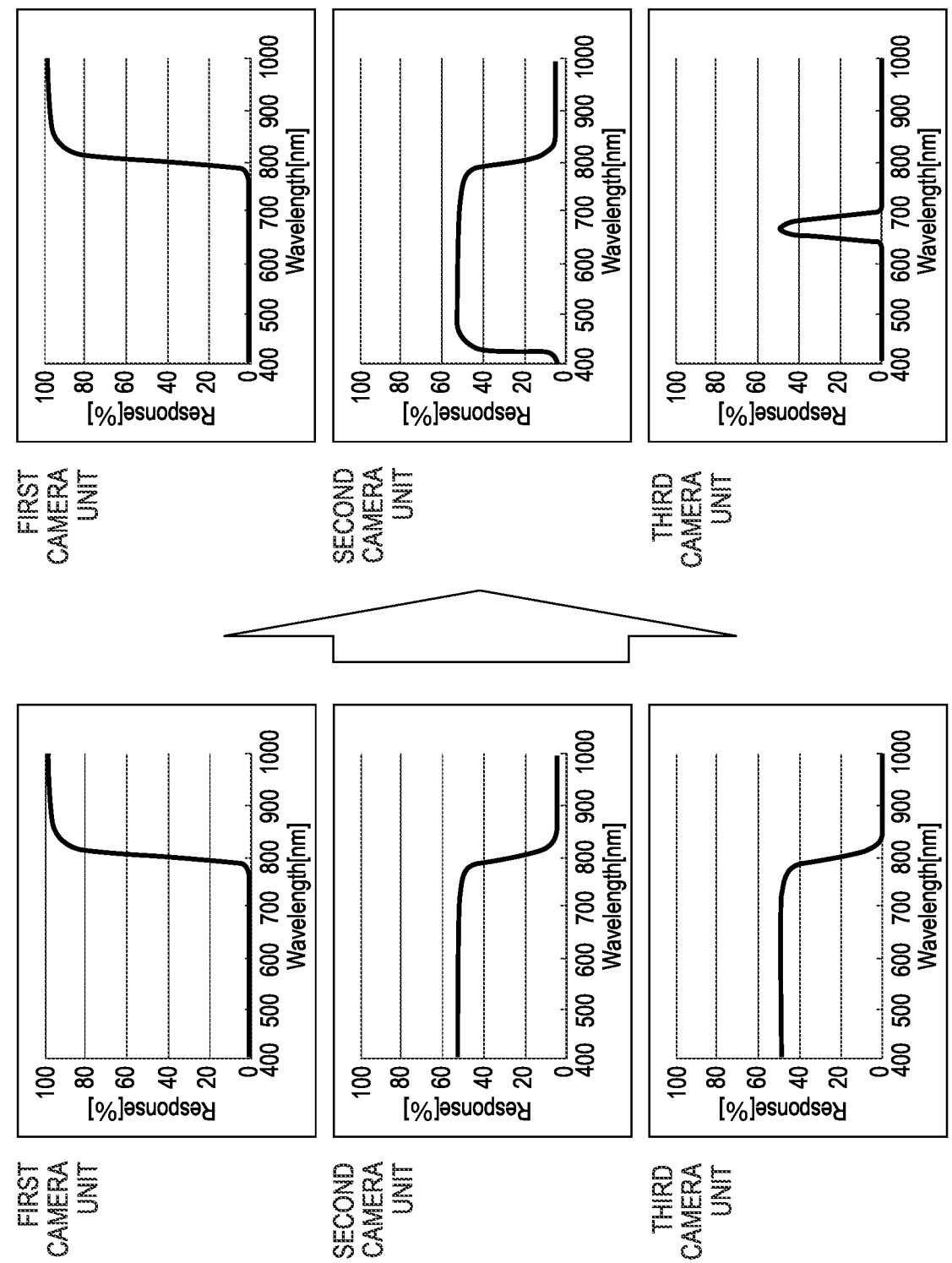
FIG. 9A is a graph showing a first example of transmission characteristics of each of the optical filters shown in FIG. 7.

Next, a combination of the optical filters OPF in each of the first optical filter holding unit FH1, the second optical filter holding unit FH2, and the third optical filter holding unit FH3, and application examples for the combination before and after a change will be described with reference to FIGS. 9A to 9B. FIG. 9A is a graph showing a first example of the transmission characteristics of the respective optical filters shown in FIG. 7. FIG. 9B is a graph showing a second example of the transmission characteristics of the respective optical filters shown in FIG. 7.

As shown in FIG. 9A, before a change (left column with reference to a figure of an arrow in FIG. 9A), the plurality of optical filters OPF held in the first optical filter holding unit FH1 of the first camera unit 11 function as the low cut filter (LCF) as a whole, and only transmits light having a wavelength of approximately 800 [nm] or more, that is, near infrared ray (IR) light. The plurality of optical filters OPF of the first optical filter holding unit FH1 of the first camera unit 11 similarly function as the low cut filter even after the change (right column with reference to the figure of the arrow in FIG. 9A), and the function is not changed. The first camera unit 11 is formed to be capable of imaging near infrared ray (IR) light by integrating the functions of the plurality of optical filters OPF of the first optical filter holding unit FH1 of the first camera unit 11.

Before the change, the plurality of optical filters OPF held in the second optical filter holding unit FH2 of the second camera unit 12 function as the high cut filter (HCF) as a whole, and only transmits light having a wavelength of less than approximately 780 [nm]. After the change, the plurality of optical filters OPF of the second optical filter holding unit FH2 of the second camera unit 12 function as the band pass filter (BPF) as a whole, only transmits light (visible light) having a wavelength of 420 to 780 [nm], and blocks light having a wavelength of bands other than 420 to 780 [nm]. The second camera unit 12 is formed to be capable of imaging visible light by integrating the functions of the plurality of optical filters OPF held in the second optical filter holding unit FH2 of the second camera unit 12.

Before the change, the plurality of optical filters OPF held in the third optical filter holding unit FH3 of the third camera unit 13 function as the high cut filter (HCF) as a whole similarly to the second camera unit 12, and only transmits light having a wavelength of less than approximately 780 [nm]. After the change, the plurality of optical filters OPF held in the third optical filter holding unit FH3 of the third camera unit 13 function as the band pass filter (BPF) as a whole, only transmits light (fluorescence) having a wavelength near 680 [nm], for example, 660 to 700 [nm] in a pinpoint manner, and blocks light having a wavelength of bands other than 660 to 700 [nm]. The third camera unit 13 is formed to be capable of imaging visible light by integrating the functions of the plurality of optical filters OPF held in the third optical filter holding unit FH3 of the third camera unit 13.

Such a combination of the optical filters OPF in each of the first optical filter holding unit FH1, the second optical filter holding unit FH2, and the third optical filter holding unit FH3 is assumed to be, for example, an application in an operating room of a hospital.

That is, the optical characteristics of the plurality of optical filters OPF held in the third optical filter holding unit FH3 of the third camera unit 13 after the change are based on a fact that a wavelength band of fluorescence emitted by a fluorescent reagent (for example, 5-ALA: 5-aminolevulinic acid) based on the excitation light from the illumination unit ILM is near 680 [nm]. Therefore, when the fluorescent reagent is administered to an affected part AFP of a patient PAT in advance before a surgery (see FIG. 13), the fluorescent reagent emits fluorescence by the excitation light of the illumination unit ILM during the surgery, and the spectral prism camera 100 captures an image together with the emission of the fluorescent reagent, so that the image of the affected part AFP can be superimposed and displayed on another image. Accordingly, it is possible to improve visibility of the affected part AFP and appropriately support progress of a medical practice.

As shown in FIG. 9B, before a change (left column with reference to a figure of an arrow in FIG. 9B), the plurality of optical filters OPF held in the first optical filter holding unit FH1 of the first camera unit 11 function as the low cut filter (LCF) as a whole, and only transmits light having a wavelength of approximately 800 [nm] or more, that is, near infrared ray (IR) light. The plurality of optical filters OPF of the first optical filter holding unit FH1 of the first camera unit 11 similarly function as the low cut filter even after the change (right column with reference to the figure of the arrow in FIG. 9B), and the function is not changed. The first camera unit 11 is formed to be capable of imaging near infrared ray (IR) light by integrating the functions of the plurality of optical filters OPF held in the first optical filter holding unit FH1 of the first camera unit 11.

Before the change, the plurality of optical filters OPF held in the second optical filter holding unit FH2 of the second camera unit 12 function as the high cut filter (HCF) as a whole, and only transmits light having a wavelength of less than approximately 800 [nm], that is visible light. The plurality of optical filters OPF held in the second optical filter holding unit FH2 of the second camera unit 12 similarly function as the high cut filter even after the change, and the function is not changed. The second camera unit 12 is formed to be capable of imaging visible light by integrating the functions of the plurality of optical filters OPF held in the second optical filter holding unit FH2 of the second camera unit 12.

Before the change, the plurality of optical filters OPF held in the third optical filter holding unit FH3 of the third camera unit 13 function as the high cut filter (HCF) as a whole similarly to the second camera unit 12, and only transmits light having a wavelength of less than approximately 800 [nm]. After the change, the plurality of optical filters OPF held in the third optical filter holding unit FH3 of the third camera unit 13 function as the band pass filter (BPF) as a whole, only transmits light (visible light of a predetermined band) having a wavelength of approximately 700 to 800 [nm], and blocks light having a wavelength of bands other than 700 to 800 [nm]. The third camera unit 13 is formed to be capable of imaging visible light by integrating the functions of the plurality of optical filters OPF held in the third optical filter holding unit FH3 of the third camera unit 13.

Such a combination of the optical filters OPF in each of the first optical filter holding unit FH1, the second optical filter holding unit FH2, and the third optical filter holding unit FH3 is similarly assumed to be, for example, the application in an operating room of a hospital.

With respect to blood vessel identification in the affected part AFP of the patient PAT during surgery, an artery can be easily identified by a near infrared image based on near infrared ray (IR) light having a wavelength of 800 [nm] or more, and a vein can be easily identified by a visible light image based on visible light having a wavelength of 700 to 800 [nm]. Therefore, the blood vessel identification (for example, an artery or a vein) is facilitated by acquiring and synthesizing images of light having different wavelengths from the first camera unit 11, the second camera unit 12, and the third camera unit 13 as described above.

Figure 10:
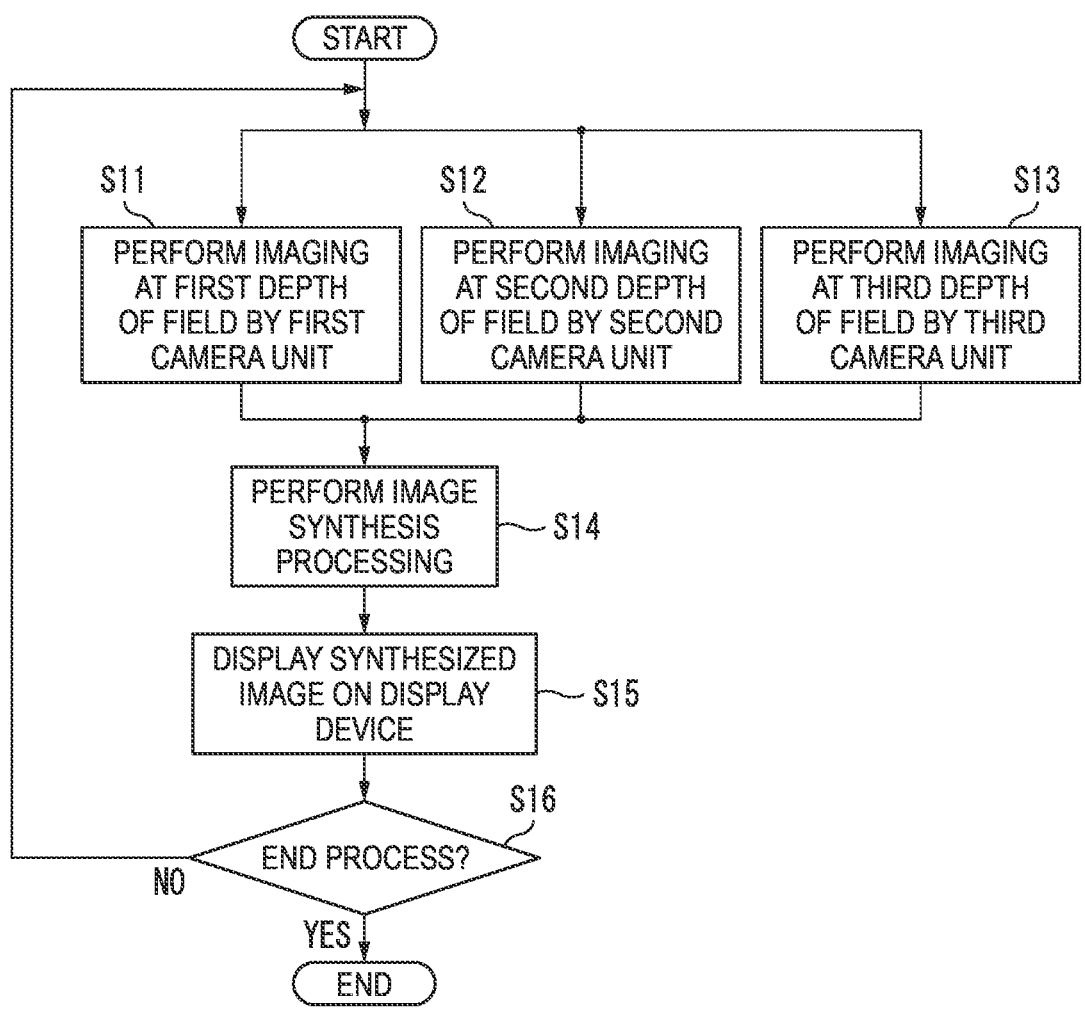
FIG. 10 is a flowchart showing an example of an operation procedure of the spectral prism camera according to the first embodiment.

Next, an example of an operation procedure of the spectral prism camera 100 according to the first embodiment will be described with reference to FIG. 10. FIG. 10 is a flowchart showing the example of the operation procedure of the spectral prism camera 100 according to the first embodiment.

As shown in FIG. 10, for example, when the cargoes PK having different heights as an example of the subject are transported by the transport device BC (see FIG. 1), the first camera unit 11 of the spectral prism camera 100 images the subject at the first depth of field D1 (S11). Simultaneously with the imaging of the first camera unit 11, the second camera unit 12 images the same subject at the second depth of field D2 (S12), and the third camera unit 13 images the same subject at the third depth of field D3 (S13).

The CCU 30 performs various types of image analysis processing using captured image data obtained based on each of the first camera unit 11, the second camera unit 12, and the third camera unit 13, and performs image synthesis processing in which each piece of the captured image data is superimposed (S14). The CCU 30 displays and outputs a result of the synthesis processing on the display device DP (S15).

When the process of the spectral prism camera 100 is not ended after the result is displayed on the display device DP (NO in S16), the process of the spectral prism camera 100 returns to steps S11 to S13. That is, the spectral prism camera 100 repeats the processes from step S11 to step S16 until the process of the spectral prism camera 100 ends. On the other hand, when the process of the spectral prism camera 100 ends (YES in S16), the spectral prism camera 100 stops processing.

As described above, the spectral prism camera 100 according to the first embodiment includes: the shared lens LS (an example of a lens) on which light from the subject such as the cargo PK transported by the transport device BC is incident; the cross prism CXP having the A surface AS (an example of the first surface) that reflects, at the first reflectance, the first light (for example, visible light or near-infrared light) having the first wavelength (for example, a wavelength band of visible light or near-infrared light) among the light from the subject, and the B surface BS that reflects, at the second reflectance, the second light (for example, visible light or near-infrared light) having the second wavelength (for example, a wavelength band of visible light or near-infrared light) among the light transmitted through the A surface AS; the first camera unit 11 (an example of the first imaging unit) that captures the first image IMG1 of the subject at the first depth of field D1 based on the first light reflected by the A surface AS; the second camera unit 12 (an example of the second imaging unit) that captures the second image IMG2 of the subject at the second depth of field D2 based on the second light reflected by the B surface BS (an example of a second surface); the third camera unit 13 (an example of the third imaging unit) that captures the third image IMG3 of the subject at the third depth of field D3 based on the third light (for example, visible light or near-infrared light) transmitted through the A surface AS or the B surface BS; and the CCU 30 (an example of the signal processing unit) that synthesizes and outputs the first image IMG1, the second image IMG2, and the third image IMG3.

For this reason, a plurality of focal positions and a plurality of depths of field (for example, the first depth of field D1, the second depth of field D2, and the third depth of field D3) are implemented by a plurality of camera units (for example, the first camera unit 11, the second camera unit 12, and the third camera unit 13), so that it is possible to set the depth of field to a wide dynamic range by using the spectral prism camera 1001. As a result, the spectral prism camera 100 implements a wide range of the depth of field in the height direction or the depth direction as viewed from the spectral prism camera 100 and appropriately performs focusing on the subjects even when the subjects having different heights are imaged, so that an image with high accuracy can be acquired. Therefore, it is possible to prevent occurrence of an operation delay related to imaging of one or more subjects present within a distance range set in advance, and to flexibly obtain a high-quality captured image corresponding to each subject.

The spectral prism camera 100 according to the first embodiment further includes: the first optical filter holding unit FH1 (an example of the first filter holding unit) that is disposed along the first imaging axis CAX1 (an example of the optical axis) of the first camera unit 11 (an example of the first imaging unit) and holds the plurality of optical filters OPF (an example of the filter) capable of adjusting the transmission band of the first light received by the first camera unit 11; the second optical filter holding unit FH2 (an example of the second filter holding unit) that is disposed along the second imaging axis CAX2 (an example of the optical axis) of the second camera unit 12 (an example of the second imaging unit) and holds the plurality of optical filters OPF (an example of the filter) capable of adjusting the transmission band of the second light received by the second camera unit 12; and the third optical filter holding unit FH3 (an example of the third filter holding unit) that is disposed along the incident axis IMX (an example of the optical axis of the third imaging unit) and holds the plurality of optical filters OPF (an example of the filter) capable of adjusting the transmission band of the third light received by the third camera unit 13 (an example of the third imaging unit).

Therefore, by setting a combination in which the optical characteristics related to the transmission band of each optical filter OPF are different in each of the first optical filter holding unit FH1, the second optical filter holding unit FH2, and the third optical filter holding unit FH3, it is possible to appropriately implement image capturing suitable for various functions (for example, the DDF and/or the HDR) or various applications (for example, the application in an operating room of a hospital).

As the first specific example, when the light transmitted through the plurality of optical filters OPF (an example of the filter) of the first optical filter holding unit FH1 (an example of the first filter holding unit) is near-infrared light, the light transmitted through the plurality of optical filters OPF (an example of the filter) of the second optical filter holding unit FH2 (an example of the second filter holding unit) is light having a wavelength of 420 to 780 [nm], and the light transmitted through the plurality of optical filters OPF (an example of the filter) of the third optical filter holding unit FH3 (an example of the third filter holding unit) is light having a wavelength of 660 to 700 [nm] (see FIG. 9A), this combination is suitable for the application in an operating room of a hospital. Therefore, when the fluorescent reagent, in which the wavelength band of fluorescence emitted based on the excitation light is near 680 [nm], is administered to the affected part AFP of the patient PAT in advance before a surgery, the fluorescent reagent emits the fluorescence by the excitation light of the illumination unit ILM during the surgery, and the spectral prism camera 100 captures an image together with the emission of the fluorescent reagent, so that the image of the affected part AFP is superimposed and displayed on another image (see FIG. 13). Accordingly, it is possible to improve the visibility of the affected part AFP and appropriately support the progress of the medical practice.

As the second specific example, when the light transmitted through the plurality of optical filters OPF (an example of the filter) of the first optical filter holding unit FH1 (an example of the first filter holding unit) is near infrared ray (IR) light having a wavelength of 800 [nm] or more, the light transmitted through the plurality of optical filters OPF (an example of the filter) of the second optical filter holding unit FH2 (an example of the second filter holding unit) is visible light, and the light transmitted through the plurality of optical filters OPF (an example of the filter) of the third optical filter holding unit FH3 (an example of the third filter holding unit) is light having a wavelength of 700 to 800 [nm] (see FIG. 9B), this combination is also suitable for the application in an operating room of a hospital. With respect to blood vessel identification in the affected part AFP of the patient PAT during surgery, an artery can be easily identified by a near infrared image based on near infrared ray (IR) light having a wavelength of 800 [nm] or more, and a vein can be easily identified by a visible light image based on visible light having a wavelength of 700 to 800 [nm]. As a result, for the application in an operating room of a hospital, images of light having different wavelengths are respectively acquired by the first camera unit 11, the second camera unit 12, and the third camera unit 13, and are synthesized, so that the blood vessel identification (for example, an artery or a vein) can be facilitated.

The spectral prism camera 100 (an example of the imaging apparatus) according to the first embodiment further includes: the camera control unit 40 (an example of the control unit) that generates the control signal of the depth of field based on the distance information to the subject such as the cargo PK transported by the transport device BC; and the first auto back focus mechanism ABF1 (an example of the drive unit), the second auto back focus mechanism ABF2 (an example of the drive unit), and the third auto back focus mechanism ABF3 (an example of the drive unit) that move at least one of the first camera unit 11 (an example of the first imaging unit), the second camera unit 12 (an example of the second imaging unit), and the third camera unit 13 (an example of the third imaging unit) in the optical axis directions thereof based on the control signal.

Accordingly, for example, even when the wavelength band of the light received by the first image sensor ISR1, the second image sensor ISR2, or the third image sensor ISR3 is selected as a different wavelength band by the camera control unit 40, or even when there is a change in optical path length due to the different wavelength band, the first image sensor ISR1, the second image sensor ISR2, or the third image sensor ISR3 can be moved in the optical axis direction thereof, so that a clear near infrared image that is in focus can be obtained.

In the spectral prism camera 100 according to the first embodiment, the first depth of field D1, the second depth of field D2, and the third depth of field D3 are spatially and continuously provided. Accordingly, the function (SDDF) related to the dynamic range of the depth of field is implemented, a wide range of the depth of field is implemented, and for example, even when the subjects such as the cargoes PK having various heights are transported, it is possible to appropriately focus and image the subjects with high accuracy.

In spectral prism camera 100 according to the first embodiment, the first light (light received by first camera unit 11), the second light (light received by second camera unit 12), and the third light (light received by third camera unit 13) are visible light. Therefore, various functions such as the SDDF and/or the HDR can be implemented by the spectral prism camera 100 (see FIG. 6).

First Modification of First Embodiment

Figure 11:
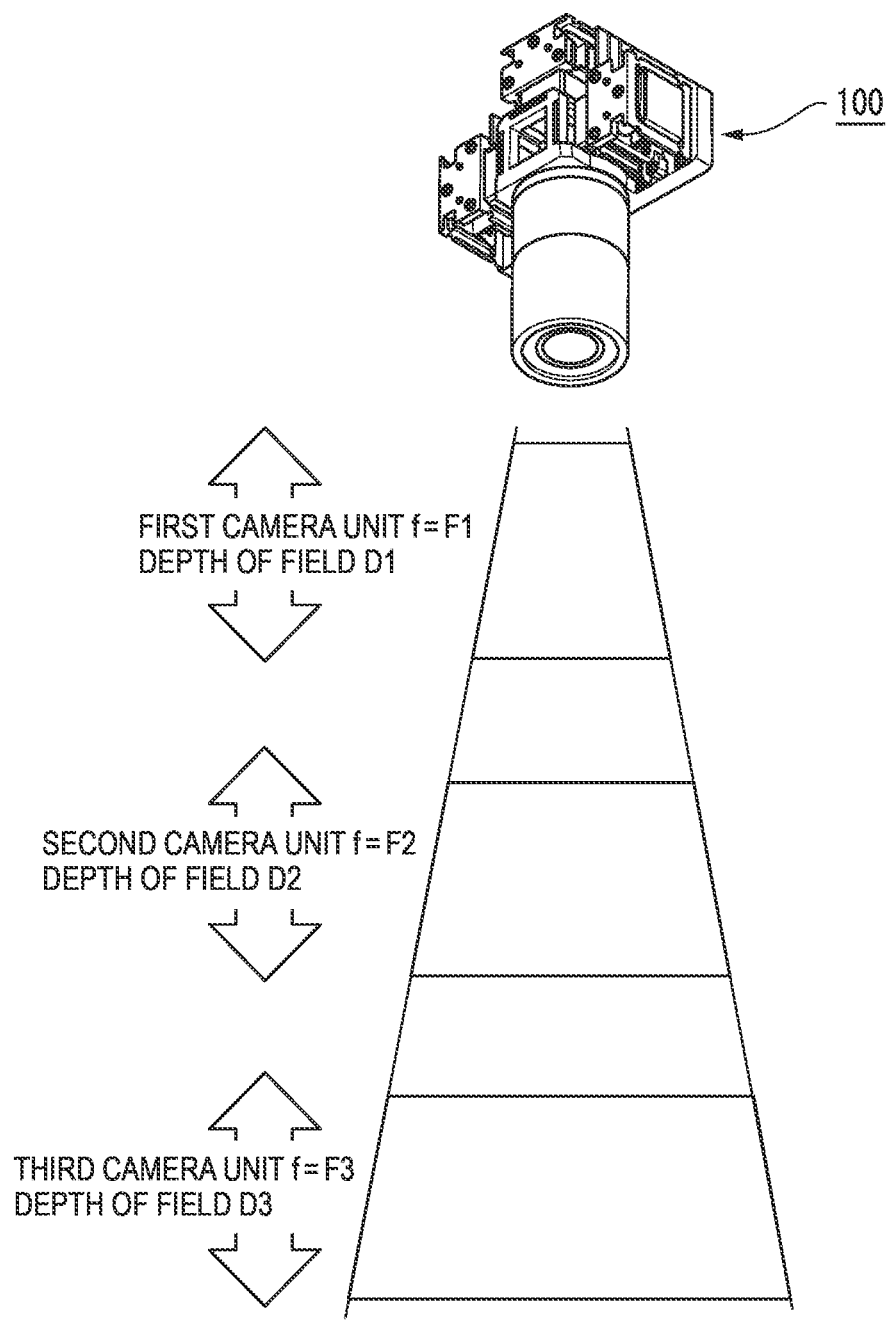
FIG. 11 is a schematic diagram showing a first modification of the first embodiment.

A first modification according to the first embodiment will be described with reference to FIG. 11. FIG. 11 is a schematic diagram showing the first modification of the first embodiment.

As shown in FIG. 11, in the present modification, when it is determined that a variation in height of the cargoes PK transported by the transport device BC is statistically concentrated to some extent at three places, the first depth of field D1, the second depth of field D2, and the third depth of field D3 are set to be spatially discontinuous. In this case, a range of the depth of field can be easily set to be wider (dynamically) than that of the first embodiment described above without increasing a cost.

As described above, in the first modification of the first embodiment, the first depth of field D1, the second depth of field D2, and the third depth of field D3 are spatially and discontinuously provided. Accordingly, the function (SDDF) related to the dynamic range of the depth of field can be implemented in a wider range as compared with the case in which the first depth of field D1, the second depth of field D2, and the third depth of field D3 are spatially and continuously provided. Therefore, the spectral prism camera 100 according to the first modification of the first embodiment implements a wider range of the depth of field than that of the spectral prism camera 100 according to the first embodiment, and more appropriately performs focusing on the subjects even when the subjects such as the cargoes PK having different heights are transported, so that the subjects can be imaged with high accuracy.

Second Modification of First Embodiment

A second modification according to the first embodiment will be described with reference to FIG. 12. FIG. 12 is a photograph showing the second modification of the first embodiment.

Figure 12:
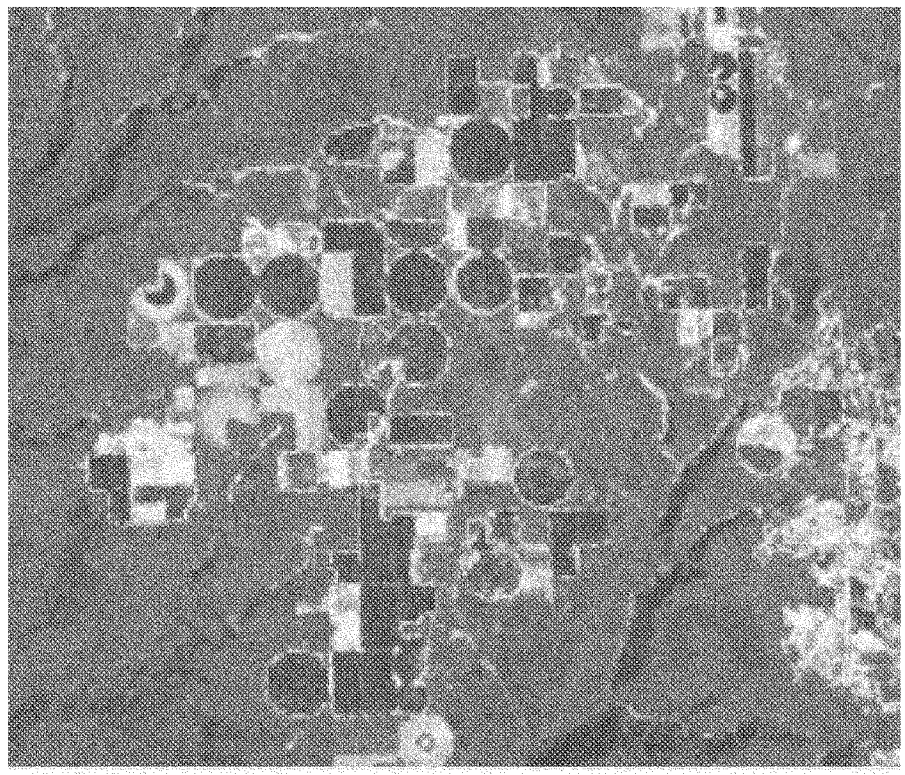
FIG. 12 is a photograph showing a second modification of the first embodiment.

In an example shown in FIG. 12, the spectral prism camera 100 is attached to a satellite device that orbits on the earth, and images an earth surface as a subject. Each of the first camera unit 11, the second camera unit 12, and the third camera unit 13 of the spectral prism camera 100 images light in different wavelength bands emitted from the earth surface. The CCU 30 executes the image analysis processing based on a normalized difference vegetation index NDVI by using captured image data acquired by the imaging. The normalized difference vegetation index NDVI is calculated by the following equation.

NDVI=(IR−R)/(IR+R)

Herein,

IR: Pixel value of infrared light (wavelength: 780 to 2500 [nm]) band

R: Pixel value of red light (wavelength: 640 to 770 [nm]) band.

A value of the NDVI is a standardized index indicating the presence or absence of vegetation and activity thereof, and the NDVI is a value indicating a range of −1.0 to 1.0. The value of the NDVI means absorption of chlorophyll dye in a red light band and high reflection characteristics due to a cell structure of a plant in a near infrared ray (IR) light band.

How chlorophyll absorbs red due to the activity of vegetation can be visualized (observed) by this value.

That is, in the image of the earth surface, a negative value mainly means cloud, water, or snow. A value close to zero mainly means a rock or the ground surface. When the NDVI is a low value (0.1 or less), a pixel indicated by the value means a barren area covered with rock, sand, or snow. When the NDVI is a medium value (0.2 to 0.3), a pixel indicated by the value means low woods or grass. When the NDVI is a high value (0.6 to 0.8), a pixel indicated by the value means a temperate forest and a tropical rainforest.

Second Embodiment

Next, a second embodiment according to the present disclosure will be described with reference to FIGS. 13 and 14. Since the description of the same or equivalent parts as those in the above-described first embodiment are duplicated, the same reference numerals may be given to the drawings to omit or simplify the description.

An example of a use case according to the second embodiment will be described with reference to FIG. 13. FIG. 13 is a diagram showing an example of a use case of a spectral prism camera 200 according to the second embodiment.

Figure 13:
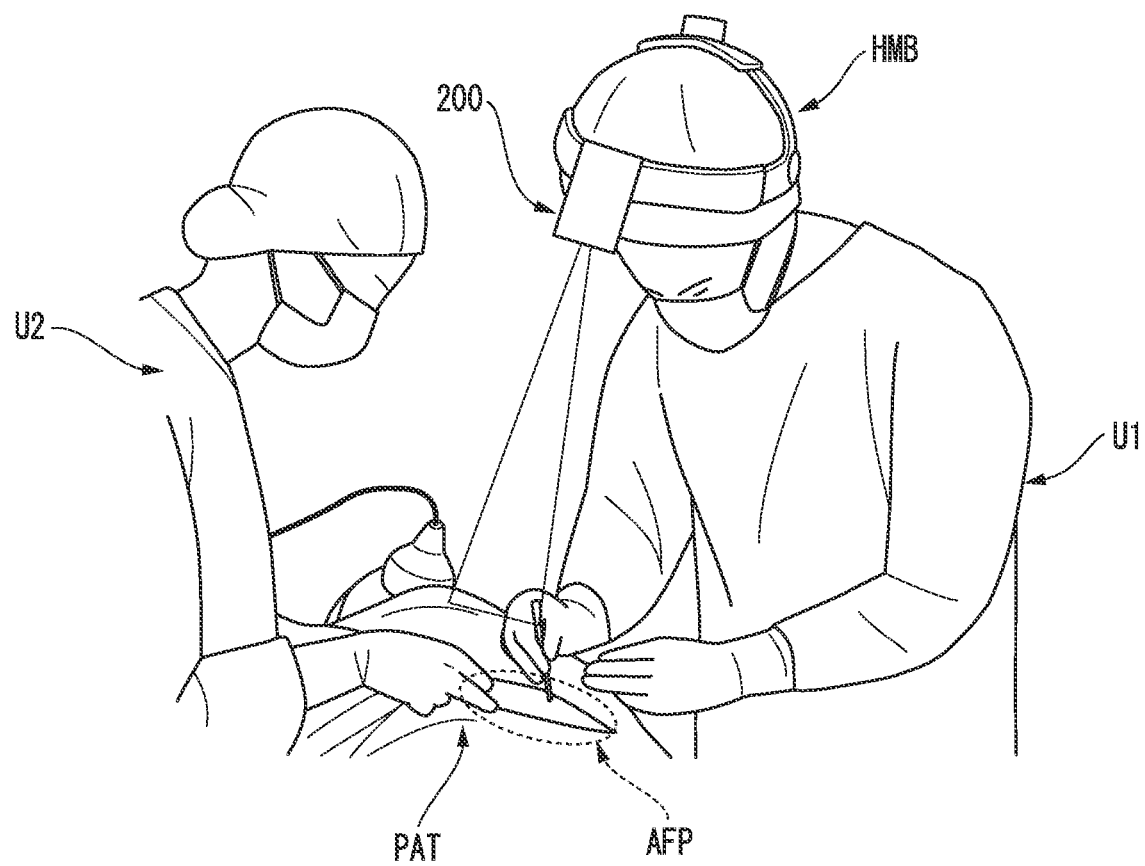
FIG. 13 is a diagram showing an example of a use case of a spectral prism camera according to a second embodiment.

As shown in FIG. 13, the spectral prism camera 200 according to the second embodiment is used by being worn by a doctor U1 who performs surgery on the patient PAT in cooperation with an assistant U2 such as a nurse. In addition, a projection device such as a projector device is mounted on the spectral prism camera 200 according to the second embodiment, and the projection device of the spectral prism camera 200 according to the second embodiment projects light (projection light) onto the affected part AFP of the patient PAT.

The spectral prism camera 200 is, for example, a head-mounted projection device that is attached and fixed to a distal end side of a headband HMB covering an outer periphery of the head of the doctor U1 and projects a projection image so as to follow movement of the head of the doctor U1. As described above, the spectral prism camera 200 according to the second embodiment is suitable for identifying, for example, the specific affected part AFP of the patient PAT or a blood vessel such as an artery or a vein (see FIGS. 9A and 9B). The use case of the spectral prism camera 200 according to the second embodiment may be not limited to a medical application in which the spectral prism camera 200 is attached to the doctor U1 during surgery.

An example of an operation procedure of the spectral prism camera 200 according to the second embodiment will be described with reference to FIG. 14. FIG. 14 is a flowchart showing the example of the operation procedure of the spectral prism camera 200 according to the second embodiment.

Figure 14:
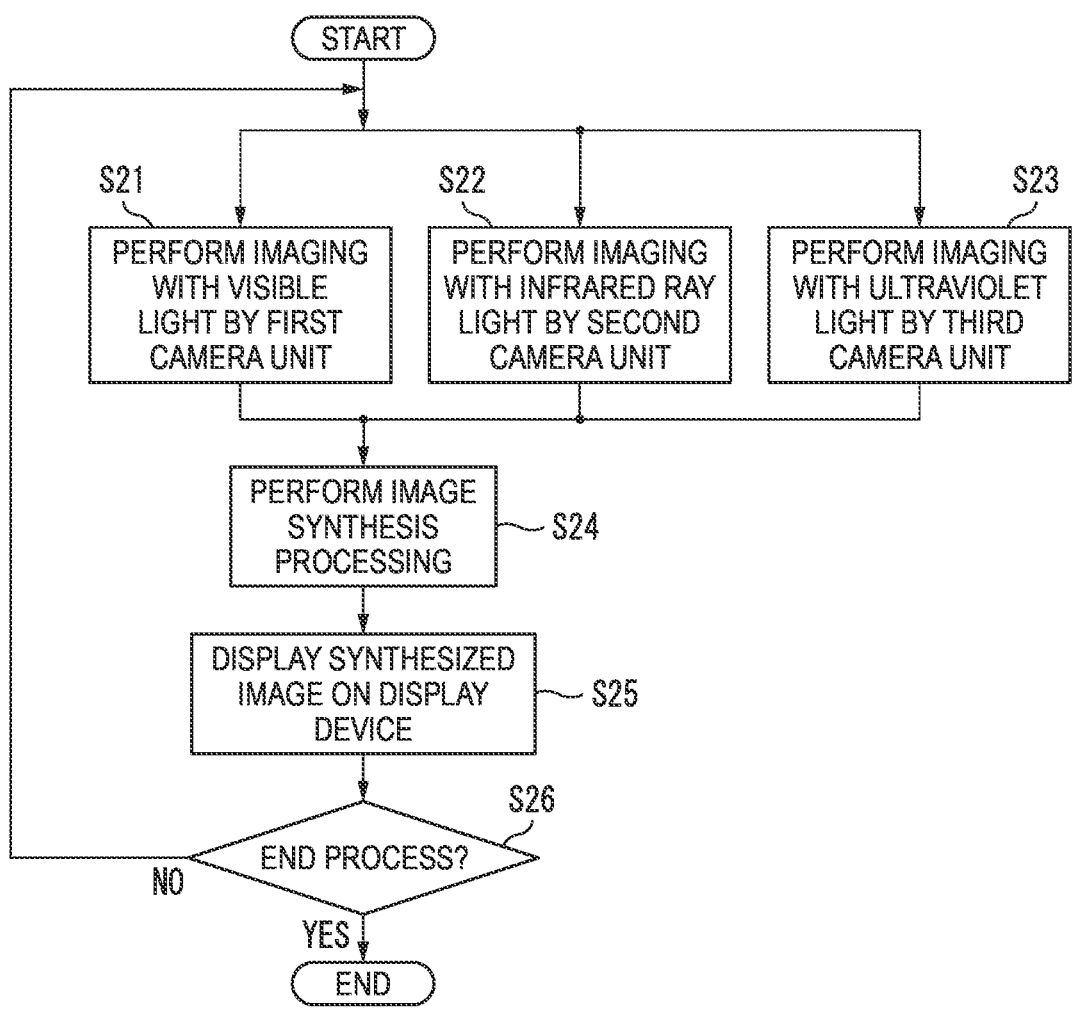
FIG. 14 is a flowchart showing an example of an operation procedure of the spectral prism camera according to the second embodiment.

As shown in FIG. 14, for example, when the affected part AFP of the patient PAT as an example of the subject is imaged by the spectral prism camera 200 (see FIG. 13), the spectral prism camera 200 images light having different wavelengths respectively by the first camera unit 11, the second camera unit 12, and the third camera unit 13. That is, the first camera unit 11 of the spectral prism camera 200 images the subject with visible light (S21). Simultaneously with the imaging of the first camera unit 11, the second camera unit 12 images the same subject (affected part AFP of the patient PAT) with infrared ray (IR) light (S22), and the third camera unit 13 images the same subject (affected part AFP of the patient PAT) with ultraviolet light (S23). In the second embodiment, the third camera unit 13 may have a configuration including the CCD or the CMOS in which a plurality of pixels suitable for imaging ultraviolet light are arranged.

The CCU 30 performs various types of image analysis processing using captured image data obtained based on each of the first camera unit 11, the second camera unit 12, and the third camera unit 13, and performs image synthesis processing in which each piece of the captured image data is superimposed (S24). The CCU 30 displays and outputs a result of the synthesis processing on the display device DP (S25).

When the process of the spectral prism camera 200 is not ended after the result is displayed on the display device DP (NO in S26), the process of the spectral prism camera 200 returns to steps S21 to S23. That is, the spectral prism camera 200 repeats the processes from step S21 to step S26 until the process of the spectral prism camera 200 ends. On the other hand, when the process of the spectral prism camera 200 ends (YES in S26), the spectral prism camera 200 stops processing.

Although a plurality of embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the above-described embodiment may be optionally combined within a range not departing from the spirit of the invention.

INDUSTRIAL APPLICABILITY

The present disclosure is useful as an imaging apparatus capable of preventing occurrence of an operation delay related to imaging of one or more subjects present within a distance range set in advance, and flexibly obtaining a high-quality captured image corresponding to each subject.

What is claimed is:

1. An imaging apparatus, comprising:
a lens on which light from at least one subject is incident;
a spectral prism including a first surface and a second surface, the first surface reflecting, at a first reflectance, first light having a first wavelength among the light from the subject, the second surface reflecting, at a second reflectance, second light having a second wavelength among light transmitted through the first surface;
a first imaging unit that captures a first image of the subject at a first depth of field based on at least the first light reflected by the first surface;
a second imaging unit that captures a second image of the subject at a second depth of field based on at least the second light reflected by the second surface;
a third imaging unit that captures a third image of the subject at a third depth of field based on at least third light transmitted through the first surface or the second surface;
a signal processing unit that synthesizes the first image, the second image, and the third image, and outputs a synthesized image;
a control unit that generates a control signal of a depth of field based on distance information to the subject; and
a drive unit that moves at least one of the first imaging unit, the second imaging unit, or the third imaging unit in optical axis directions thereof based on the control signal, wherein the first depth of field, the second depth of field, and the third depth of field are spatially and discontinuously provided.

2. The imaging apparatus according to claim 1, further comprising:
a first filter holding unit that is disposed along a first optical axis of the first imaging unit and holds a first plurality of filters capable of adjusting a first transmission band of the first light received by the first imaging unit;
a second filter holding unit that is disposed along a second optical axis of the second imaging unit and holds a second plurality of filters capable of adjusting a second transmission band of the second light received by the second imaging unit; and
a third filter holding unit that is disposed along a third optical axis of the third imaging unit and holds a third plurality of filters capable of adjusting a third transmission band of the third light received by the third imaging unit.

3. The imaging apparatus according to claim 1, wherein the first light, the second light, and the third light are visible light.

4. The imaging apparatus according to claim 2, wherein light transmitted through the first plurality of filters of the first filter holding unit is near-infrared light,
light transmitted through the second plurality of filters of the second filter holding unit is light having a wavelength of 420 to 780 nm, and
light transmitted through the third plurality of filters of the third filter holding unit is light having a wavelength of 660 to 700 nm.

5. The imaging apparatus according to claim 2, wherein light transmitted through the first plurality of filters of the first filter holding unit is near-infrared light having a wavelength of more than 800 nm,
light transmitted through the second plurality of filters of the second filter holding unit is visible light, and
light transmitted through the third plurality of filters of the third filter holding unit is light having a wavelength of 700 to 800 nm.

6. An imaging apparatus, comprising:
a lens on which light from at least one subject is incident;
a spectral prism including a first surface and a second surface, the first surface reflecting, at a first reflectance, first light having a first wavelength among the light from the subject, the second surface reflecting, at a second reflectance, second light having a second wavelength among light transmitted through the first surface;
a first imaging unit that captures a first image of the subject at a first depth of field based on at least the first light reflected by the first surface;
a second imaging unit that captures a second image of the subject at a second depth of field based on at least the second light reflected by the second surface;
a third imaging unit that captures a third image of the subject at a third depth of field based on at least third light transmitted through the first surface or the second surface; and
a signal processing unit that synthesizes the first image, the second image, and the third image, and outputs a synthesized image,
wherein the first depth of field, the second depth of field, and the third depth of field are spatially and discontinuously provided.

7. An imaging apparatus, comprising:
a lens on which light from at least one subject is incident;
a spectral prism including a first surface and a second surface, the first surface reflecting, at a first reflectance, first light having a first wavelength among the light from the subject, the second surface reflecting, at a second reflectance, second light having a second wavelength among light transmitted through the first surface;
a first camera that captures a first image of the subject at a first depth of field based on at least the first light reflected by the first surface;
a second camera that captures a second image of the subject at a second depth of field based on at least the second light reflected by the second surface;
a third camera that captures a third image of the subject at a third depth of field based on at least third light transmitted through the first surface or the second surface;
at least one processor that:
  synthesizes the first image, the second image, and the third image, and outputs a synthesized image; and
  generates a control signal of a depth of field based on distance information to the subject; and
a driver that moves at least one of the first imaging unit, the second imaging unit, or the third imaging unit in optical axis directions thereof based on the control signal, wherein the first depth of field, the second depth of field, and the third depth of field are spatially and discontinuously provided.

* * * * *